(12) United States Patent
Morozov et al.

(10) Patent No.: US 12,231,935 B2
(45) Date of Patent: Feb. 18, 2025

(54) CHANNEL QUALITY MEASUREMENT REPORTING

(71) Applicant: APPLE INC., Cupertino, CA (US)

(72) Inventors: Gregory V. Morozov, Nizhny Novgorod (RU); Debdeep Chatterjee, San Jose, CA (US); Bharat Shrestha, Hillsboro, OR (US); Qiaoyang Ye, San Jose, CA (US)

(73) Assignee: APPLE INC., Cupertino, CA (US)

( * ) Notice: Subject to any disclaimer, the term of this patent is extended or adjusted under 35 U.S.C. 154(b) by 114 days.

(21) Appl. No.: 17/263,463

(22) PCT Filed: Aug. 2, 2019

(86) PCT No.: PCT/US2019/044991
§ 371 (c)(1),
(2) Date: Jan. 26, 2021

(87) PCT Pub. No.: WO2020/028865
PCT Pub. Date: Feb. 6, 2020

(65) Prior Publication Data
US 2021/0219166 A1    Jul. 15, 2021

Related U.S. Application Data

(60) Provisional application No. 62/804,969, filed on Feb. 13, 2019, provisional application No. 62/739,070, (Continued)

(51) Int. Cl.
*H04W 24/10* (2009.01)
*H04L 1/20* (2006.01)
(Continued)

(52) U.S. Cl.
CPC ............. *H04W 24/10* (2013.01); *H04L 1/203* (2013.01); *H04W 4/70* (2018.02); *H04W 8/24* (2013.01);
(Continued)

(58) Field of Classification Search
None
See application file for complete search history.

(56) References Cited

U.S. PATENT DOCUMENTS

| | | | |
|---|---|---|---|
| 2016/0057785 A1 | 2/2016 | Yuanyuan et al. | |
| 2020/0015273 A1* | 1/2020 | Zhang | H04B 7/088 |

(Continued)

FOREIGN PATENT DOCUMENTS

| | | |
|---|---|---|
| CN | 105659687 A | 6/2016 |
| CN | 107431522 A | 12/2017 |
| JP | 2018046446 A | 3/2018 |

OTHER PUBLICATIONS

R1-1804897 (Year: 2018).*

(Continued)

*Primary Examiner* — Kodzovi Acolatse
*Assistant Examiner* — Anindita Sen
(74) *Attorney, Agent, or Firm* — Dorsey & Whitney LLP

(57) ABSTRACT

Technology for a user equipment (UE) operable to perform downlink (DL) channel quality measurement reporting is disclosed. The UE can decode a system information block type y bandwidth reduced (SIBy-BR) received from an eNodeB. The SIB1-BR can instruct the UE to include a DL channel quality measurement report in a message 3 (Msg3) transmitted during a random access procedure between the UE and the eNodeB, wherein y is a positive integer greater than or equal to 1. The UE can determine a DL channel quality measurement for a DL channel between the UE and the eNodeB. The UE can encode the Msg3 for delivery over (Continued)

an uplink channel to the eNodeB. The Msg3 can be delivered during the random access procedure and can include the DL channel quality measurement report with the DL channel quality measurement.

16 Claims, 27 Drawing Sheets

Related U.S. Application Data filed on Sep. 28, 2018, provisional application No. 62/713,978, filed on Aug. 2, 2018.

(51) Int. Cl.
    *H04W 4/70*          (2018.01)
    *H04W 8/24*          (2009.01)
    *H04W 74/0833*     (2024.01)
    *H04W 80/02*         (2009.01)

(52) U.S. Cl.
    CPC ....... *H04W 74/0833* (2013.01); *H04W 80/02* (2013.01)

(56) References Cited

U.S. PATENT DOCUMENTS

| | | | | |
|---|---|---|---|---|
| 2020/0015280 | A1* | 1/2020 | Fujishiro | H04W 16/26 |
| 2020/0059390 | A1* | 2/2020 | Zhang | H04L 1/0007 |
| 2020/0137588 | A1* | 4/2020 | Zhang | H04L 5/0053 |
| 2020/0383119 | A1* | 12/2020 | Sun | G16Y 10/75 |
| 2020/0403760 | A1* | 12/2020 | Ratasuk | H04L 5/0005 |
| 2021/0152318 | A1* | 5/2021 | Park | H04L 1/203 |
| 2021/0392567 | A1* | 12/2021 | Rune | H04W 68/005 |
| 2022/0006575 | A1* | 1/2022 | Cozzo | H04L 1/1819 |
| 2022/0117000 | A1* | 4/2022 | Feltrin | H04W 24/10 |

OTHER PUBLICATIONS 1804897 (Year: 2018).*
R2-1807749 (Year: 2018).*
R2-1807869 (Year: 2018).*
ETSI TS 138 321 (Year: 2018).*
R2-1807276 (Year: 2018).*
R1-1805407 (Year: 2018).*
3gpp 123501 (Year: 2018).*
R!1805407 (Year: 2018).*
Ericsson, Downlink Channel Quality reporting in MSG3 in NB-IoT, R2-1807749, 3GPP TSG-RAN2 Meeting #102, Busan, South Korea, Agenda Item 8.11.2 Other ,May 21-25, 2018 ,5 pages.
Huawei, Hisilicon, Introduction of DL channel quality reporting in MSG3, R2-1807869, 3GPP TSG-RAN WG2 Meeting #102, Busan, Korea, Agenda Item 8.11.2 (Revision of R2-1805076) , May 21-25, 2018 , 10 pages.
Huawei, Hisilicon, Qualcomm Incorporated, Introduction of EDT for eMTC and NB-IoT enhancements, R2-1807276, 3GPP TSG-RAN2 Meeting #102, Busan, Korea (Republic Of), Change Request 36.331 CR 3389 Rev 1 Current Version 15.1.0 , May 21-25, 2018 , 75 pages.
PCT/US2019/044991, International Search Report and Written Opinion, Nov. 15, 2019, 8 pages.
Samsung, Remaining Issues for Msg3 based SI Request, R2-1806832, 3GPP TSG-RAN2 102, Busan, South Korea, Agenda Item 10.3.1.4.3 , May 21-25, 2018, 4 pages.
Zhang, Haijun , et al., "Network Slicing Based 5G and Future Mobile Networks: Mobility, Resource Management, and Challenges", IEEE Communications Magazine, Apr. 25, 2017, 19 pages.

* cited by examiner

| CQI index | modulation | code rate x 1024 x $R^{CSI}$ | efficiency x $R^{CSI}$ |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

FIG. 2

| CQI index | modulation | code rate x 1024 | repetition |
|---|---|---|---|
| 0 | out of range | | |
| 1 | QPSK | 56 | 32 |
| 2 | QPSK | 207 | 16 |
| 3 | QPSK | 266 | 4 |
| 4 | QPSK | 195 | 2 |
| 5 | QPSK | 142 | 1 |
| 6 | QPSK | 266 | 1 |
| 7 | QPSK | 453 | 1 |
| 8 | 16QAM | 637 | 1 |
| 9 | 16QAM | 423 | 1 |
| 10 | 16QAM | 557 | 1 |
| 11 | 64QAM | 696 | 1 |
| 12 | 64QAM | 845 | 1 |
| 13 | 64QAM | 651 | 1 |
| 14 | 64QAM | 780 | 1 |
| 15 | 64QAM | 888 | 1 |

FIG. 3

```
-- ASN1START

RRCConnectionResumeRequest-r13 ::=     SEQUENCE {
  criticalExtensions                   CHOICE {
     rrcConnectionResumeRequest-r13          RRCConnectionResumeRequest-r13-
IEs,
     criticalExtensionsFuture           SEQUENCE {}
  }
}

RRCConnectionResumeRequest-r13-IEs ::=     SEQUENCE {
  resumeIdentity-r13                       CHOICE {
     resumeID-r13                          ResumeIdentity-r13,
     truncatedResumeID-r13                    BIT STRING (SIZE (24))
  },
  shortResumeMAC-I-r13                        BIT STRING (SIZE (16)),
  resumeCause-r13                          ResumeCause,
  cqi-MPDCCH-r16                              CQI-MPDCCH-r16
}

ResumeCause ::=             ENUMERATED {
                            emergency, highPriorityAccess, mt-Access, mo-
Signalling,
                            mo-Data, delayTolerantAccess-v1020, mo-
VoiceCall-v1280, spare1}

CQI-MPDCCH-r16 ::=          SEQUENCE {
    cqi-MPDCCH-Report-r16      ENUMERATED {
                               cqi-report1, cqi-report2, cqi-report3, cqi-
                               report4, cqi-report5, cqi-report6, cqi-
                               report7, cqi-report8, spare8, spare7, spare6,
                               spare5, spare4, spare3, spare2, spare1},
    spare                   BIT STRING (SIZE (4))
}

-- ASN1STOP
```

FIG. 5

| *RRCConnectionResumeRequest* field descriptions |
|---|
| *cqi-MPDCCH* <br> This field indicates the measured DL channel quality of the serving cell as specified in TS 36.133 [16]. This field is present only when used for EDT. |
| *resumeCause* <br> Provides the resume cause for the RRC connection resume request as provided by the upper layers. |
| *resumeIdentity* <br> UE identity to facilitate UE context retrieval at eNB |
| *shortResumeMAC-I* <br> Authentication token to facilitate UE authentication at eNB |

FIG. 6

```
-- ASN1START

RRCConnectionResumeRequest-r13 ::=   SEQUENCE {
  criticalExtensions                   CHOICE {
     rrcConnectionResumeRequest-r13         RRCConnectionResumeRequest-r13-IEs,
     criticalExtensionsFuture           CHOICE {
        rrcConnectionResumeRequest-r16       RRCConnectionResumeRequest-r16-
IEs,
        criticalExtensionsFuture-r16    SEQUENCE {}
     }
  }
}

RRCConnectionResumeRequest-r13-IEs ::=    SEQUENCE {
 resumeIdentity-r13                         CHOICE {
    resumeID-r13                            ResumeIdentity-r13,
    truncatedResumeID-r13                      BIT STRING (SIZE (24))
 },
 shortResumeMAC-I-r13                         BIT STRING (SIZE (16)),
 resumeCause-r13                            ResumeCause,
 spare                                   BIT STRING (SIZE (1))
}

RRCConnectionResumeRequest-r16-IEs ::=    SEQUENCE {
 resumeID-r16                            ResumeIdentity-r13,
 shortResumeMAC-I-r16                         BIT STRING (SIZE (16)),
 resumeCause-r16                            ResumeCause,
 cqi-MPDCCH-r16                               CQI-MPDCCH-r16,
    spare                                BIT STRING (SIZE (5))
}

ResumeCause ::=            ENUMERATED {
                              emergency, highPriorityAccess, mt-Access, mo-
Signalling,
                              mo-Data, delayTolerantAccess-v1020, mo-
VoiceCall-v1280, spare1}

CQI-MPDCCH-r16 ::=         ENUMERATED {
                                  cqi-report1, cqi-report2, cqi-report3,
cqi-report4, cqi-report5, cqi-report6, cqi-report7, cqi-report8, spare8,
spare7, spare6, spare5, spare4, spare3, spare2, spare1}

-- ASN1STOP
```

FIG. 7

| *RRCConnectionResumeRequest* field descriptions |
|---|
| *cqi-MPDCCH* <br> This field indicates the measured DL channel quality of the serving cell as specified in TS 36.133 [16]. |
| *resumeCause* <br> Provides the resume cause for the RRC connection resume request as provided by the upper layers. |
| *resumeIdentity* <br> UE identity to facilitate UE context retrieval at eNB |
| *shortResumeMAC-I* <br> Authentication token to facilitate UE authentication at eNB |

FIG. 8

```
-- ASN1START

UL-CCCH-Message ::= SEQUENCE {
 message                 UL-CCCH-MessageType
}

UL-CCCH-MessageType ::= CHOICE {
 c1                      CHOICE {
    rrcConnectionReestablishmentRequest
 RRCConnectionReestablishmentRequest,
    rrcConnectionRequest           RRCConnectionRequest
 },
 messageClassExtension   CHOICE {
    c2                   CHOICE {
       rrcConnectionResumeRequest-r13
 RRCConnectionResumeRequest-r13
    },
    messageClassExtensionFuture-r13 CHOICE {
        c3                   CHOICE {
        rrcEarlyDataRequest-r15      RRCEarlyDataRequest-r15,
        spare    NULL
        },
        messageClassExtensionFurther-r15    CHOICE {
           c3             CHOICE {
              rrcConnectionResumeRequest-r16
 RRCConnectionResumeRequest-r16,
              spare    NULL
           },
           messageClassExtensionFurther-r1    SEQUENCE { }
        }
     }
  }
 }
}

-- ASN1STOP
```

FIG. 9

```
-- ASN1START

UL-CCCH-Message ::= SEQUENCE {
 message              UL-CCCH-MessageType
}

UL-CCCH-MessageType ::= CHOICE {
 c1                   CHOICE {
    rrcConnectionReestablishmentRequest
 RRCConnectionReestablishmentRequest,
    rrcConnectionRequest              RRCConnectionRequest
 },
 messageClassExtension CHOICE {
    c2                   CHOICE {
       rrcConnectionResumeRequest-r13
 RRCConnectionResumeRequest-r13
    },
    messageClassExtensionFuture-r13 CHOICE {
       c3                   CHOICE {
       rrcEarlyDataRequest-r15         RRCEarlyDataRequest-r15,
       rrcConnectionResumeRequest-r16
 RRCConnectionResumeRequest-r16
       },
       messageClassExtensionFurther-r15
 SEQUENCE {}
    }
 }
}

-- ASN1STOP
```

FIG. 10

```
-- ASN1START

SystemInformationBlockType2 ::=        SEQUENCE {
 ac-BarringInfo                        SEQUENCE {
    ac-BarringForEmergency             BOOLEAN,
    ac-BarringForMO-Signalling         AC-BarringConfig              OPTIONAL,
 -- Need OP
    ac-BarringForMO-Data               AC-BarringConfig              OPTIONAL
 -- Need OP
 }                                                                   OPTIONAL, -- Need
OP
 radioResourceConfigCommon             RadioResourceConfigCommonSIB,
 ue-TimersAndConstants                 UE-TimersAndConstants,
 freqInfo                              SEQUENCE {
    ul-CarrierFreq                     ARFCN-ValueEUTRA              OPTIONAL,
 -- Need OP
    ul-Bandwidth                       ENUMERATED {n6, n15, n25, n50, n75, n100}
                                                                     OPTIONAL, -- Need
OP
    additionalSpectrumEmission         AdditionalSpectrumEmission
 },
 mbsfn-SubframeConfigList              MBSFN-SubframeConfigList      OPTIONAL,
 -- Need OR
 timeAlignmentTimerCommon              TimeAlignmentTimer,
 ...,
 lateNonCriticalExtension              OCTET STRING (CONTAINING
SystemInformationBlockType2-v8h0-IEs)                                OPTIONAL,
 [[ ssac-BarringForMMTEL-Voice-r9      AC-BarringConfig              OPTIONAL,
 -- Need OP
    ssac-BarringForMMTEL-Video-r9      AC-BarringConfig              OPTIONAL
 -- Need OP
 ]],
 [[ ac-BarringForCSFB-r10              AC-BarringConfig              OPTIONAL --
Need OP
 ]],
 [[ ac-BarringSkipForMMTELVoice-r12    ENUMERATED {true}             OPTIONAL,
 -- Need OP
    ac-BarringSkipForMMTELVideo-r12    ENUMERATED {true}             OPTIONAL,
 -- Need OP
    ac-BarringSkipForSMS-r12           ENUMERATED {true}             OPTIONAL, --
```

FIG. 11A

```
Need OP
    ac-BarringPerPLMN-List-r12        AC-BarringPerPLMN-List-r12   OPTIONAL
-- Need OP
]],
[[ voiceServiceCauseIndication-r12   ENUMERATED {true}            OPTIONAL
-- Need OP
]],
[[ acdc-BarringForCommon-r13         ACDC-BarringForCommon-r13    OPTIONAL,
-- Need OP
    acdc-BarringPerPLMN-List-r13      ACDC-BarringPerPLMN-List-r13 OPTIONAL
-- Need OP
]],
[[
    udt-RestrictingForCommon-r13      UDT-Restricting-r13          OPTIONAL,
-- Need OR
    udt-RestrictingPerPLMN-List-r13   UDT-RestrictingPerPLMN-List-r13
OPTIONAL, -- Need OR
    cIoT-EPS-OptimisationInfo-r13     CIOT-EPS-OptimisationInfo-r13
OPTIONAL, -- Need OP
    useFullResumeID-r13               ENUMERATED {true}            OPTIONAL
-- Need OP
]],
[[ unicastFreqHoppingInd-r13         ENUMERATED {true}            OPTIONAL
-- Need OP
]],
[[ mbsfn-SubframeConfigList-v1430    MBSFN-SubframeConfigList-v1430
OPTIONAL, -- Need OP
    videoServiceCauseIndication-r14   ENUMERATED {true}            OPTIONAL
-- Need OP
]],
[[ plmn-InfoList-r15                 PLMN-InfoList-r15            OPTIONAL
-- Need OP
]],
[[ reducedCP-LatencyEnabled-r15      ENUMERATED {true}            OPTIONAL,
-- Need OR
    cp-EDT-r15                        ENUMERATED {true}            OPTIONAL, -- Need
OP
    up-EDT-r15                        ENUMERATED {true}            OPTIONAL, -- Need
OP
    idleModeMeasurements-r15          ENUMERATED {true}            OPTIONAL
-- Need OR
]],
[[
cqi-ReportAllowed-r16                 ENUMERATED {true}            OPTIONAL -- Need
OR
]]
}
```

FIG. 11B

*cp-EDT*
This field indicates if the UE is allowed to initiate CP-EDT, see 5.3.3.1b.

*cqi-ReportAllowed*
This field indicates that the eNB can process the CQI report in Msg3.

*idleModeMeasurements*
This field indicates that the eNB can process indication of IDLE mode measurements from UE.

FIG. 12

```
-- ASN1START

RRCConnectionResumeRequest-r13 ::=    SEQUENCE {
  criticalExtensions                      CHOICE {
      rrcConnectionResumeRequest-r13          RRCConnectionResumeRequest-r13-IEs,
      criticalExtensionsFuture                CHOICE {
         rrcConnectionResumeRequest-r16           RRCConnectionResumeRequest-r16-
IEs,
         criticalExtensionsFuture-r16    SEQUENCE {}
      }

}
}

RRCConnectionResumeRequest-r13-IEs ::=     SEQUENCE {
  resumeIdentity-r13                       CHOICE {
      resumeID-r13                             ResumeIdentity-r13,
      truncatedResumeID-r13                       BIT STRING (SIZE (24))
  },
  shortResumeMAC-I-r13                        BIT STRING (SIZE (16)),
  resumeCause-r13                          ResumeCause,
  spare                                 BIT STRING (SIZE (1))
}

RRCConnectionResumeRequest-r16-IEs ::=     SEQUENCE {
  resumeIdentity-r13                       CHOICE {
      resumeID-r13                             ResumeIdentity-r13,
      truncatedResumeID-r13                       BIT STRING (SIZE (24))
  },
  shortResumeMAC-I-r16                        BIT STRING (SIZE (16)),
  resumeCause-r16                          ResumeCause,
  cqi-MPDCCH-r16                              CQI-MPDCCH-r16,
     spare                              BIT STRING (SIZE (4))
}

ResumeCause ::=             ENUMERATED {
                               emergency, highPriorityAccess, mt-Access, mo-
Signalling,
                               mo-Data, delayTolerantAccess-v1020, mo-
VoiceCall-v1280, spare1}

CQI-MPDCCH-r16 ::=           ENUMERATED {
                                  cqi-report1, cqi-report2, cqi-report3,
cqi-report4, cqi-report5, cqi-report6, cqi-report7, cqi-report8, spare8,
spare7, spare6, spare5, spare4, spare3, spare2, spare1}

-- ASN1STOP
```

FIG. 13

| Codepoint/Index | LCID values |
|---|---|
| 00000 | CCCH |
| 00001-01010 | Identity of the logical channel |
| 01011 | CCCH |
| 01100 | CCCH |
| 01101 | CCCH and Extended Power Headroom Report |
| 01110 | CCCH and Channel Quality Report |
| 01111 | Reserved |
| 10000 | Extended logical channel ID field |
| 10001 | Reserved |
| 10010 | AUL confirmation (4 octets) |
| 10011 | AUL confirmation (1 octet) |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 16

| Codepoint/Index | LCID values |
|---|---|
| 00000 | CCCH |
| 00001-01010 | Identity of the logical channel |
| 01011 | CCCH |
| 01100 | CCCH |
| 01101 | CCCH and Extended Power Headroom Report |
| 01110 | Channel Quality Report |
| 01111 | Reserved |
| 10000 | Extended logical channel ID field |
| 10001 | Reserved |
| 10010 | AUL confirmation (4 octets) |
| 10011 | AUL confirmation (1 octet) |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 17

```
RRCConnectionResumeRequest-r16-IEs ::=     SEQUENCE {
  resumeIdentity-r13                         CHOICE {
     resumeID-r13                            ResumeIdentity-r13,
     truncatedResumeID-r13                     BIT STRING (SIZE (24))
  },
  shortResumeMAC-I-r16                         BIT STRING (SIZE (16)),
  resumeCause-r16                            ResumeCause, repetitionLevel                   ENUMERATED {r1or2, r4, r8, r16, r32,
r64, r128, r256},
aggregationLevel                 ENUMERATED {AG0, AG1, AG2, AG3} spare                                   BIT STRING (SIZE (3))
}
```

FIG. 18

```
RRCConnectionResumeRequest-r16-IEs ::=     SEQUENCE {
  resumeIdentity-r13                         CHOICE {
     resumeID-r13                            ResumeIdentity-r13,
     truncatedResumeID-r13                     BIT STRING (SIZE (24))
  },
  shortResumeMAC-I-r16                         BIT STRING (SIZE (16)),
  resumeCause-r16                            ResumeCause,
  repetitionLevel-MPDCCH-r16                 ENUMERATED { R1, R2, R3, R4,
R5, R6, R7, R8 }
aggregationLevel-MPDCCH-r16                  ENUMERATED {AG0, AG1, AG2,
AG3},
offset-NB-r16                         ENUMERATED {0, 1, 2, 3, 4, 5,
6, 7}

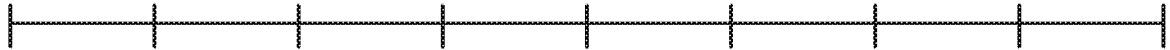

| Repetition Level | AG Level | R | R | R |

MAC CE indicating only repetition level and aggregation level

| Repetition Level | AG Level | FH | R | R |

MAC CE indicating further average report of all hopped NBs (FH = 1) or report of single NB (FH = 0)

| Repetition Level | AG Level | NB | R | R |

MAC CE indicating further report of the NB used to receive the RAR (NB = 1) or NB indicated in RAR to schedule Msg4 (NB = 0)

| Repetition Level | AG Level | NB Offset |

MAC CE indicating further the NB offset to determine NB where measurement is taken

FIG. 20

| PRACH CE level used in Msg1 | Repetition levels set for 2 bits report (four code points) |
|---|---|
| 0 | 1, 2, 4, 8 |
| 1 | 4, 8, 16, 32 |
| 2 | 16, 32, 64, 128 |
| 3 | 32, 64, 128, 256 |

FIG. 21

… # CHANNEL QUALITY MEASUREMENT REPORTING

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIGS. 2 and 3 illustrate channel quality indicator (CQI) tables in accordance with an example;

FIG. 5 illustrates Abstract Syntax Notation (ASN) code for a radio resource control (RRC) connection resume request message in accordance with an example;

FIG. 6 is a table of field descriptions for an RRC connection resume request message in accordance with an example;

FIG. 7 illustrates ASN code for a radio resource control (RRC) connection resume request message in accordance with an example;

FIG. 8 is a table of field descriptions for an RRC connection resume request message in accordance with an example;

FIGS. 9 and 10 illustrate ASN code for uplink common control channel (UL-CCCH) messages in accordance with an example;

FIGS. 11A and 11B illustrate ASN code for a system information block type 2 (SIB2) in accordance with an example;

FIG. 12 is a table of field descriptions for a SIB2 in accordance with an example;

FIG. 13 illustrates ASN code for an RRC connection resume request message in accordance with an example;

FIGS. 16 and 17 illustrate tables of logical channel identifier (LCID) values for an uplink shared channel (UL-SCH) in accordance with an example;

FIGS. 18 and 19 illustrate ASN codes for an RRC connection resume request that includes IEs for a repetition level and an aggregation level in accordance with an example;

FIG. 20 illustrates a MAC CE that is used to convey a repetition level and an aggregation level in accordance with an example;

FIG. 21 illustrates a table of physical random access channel (PRACH) control element (CE) levels and corresponding repetition levels in accordance with an example;

Figure 1:
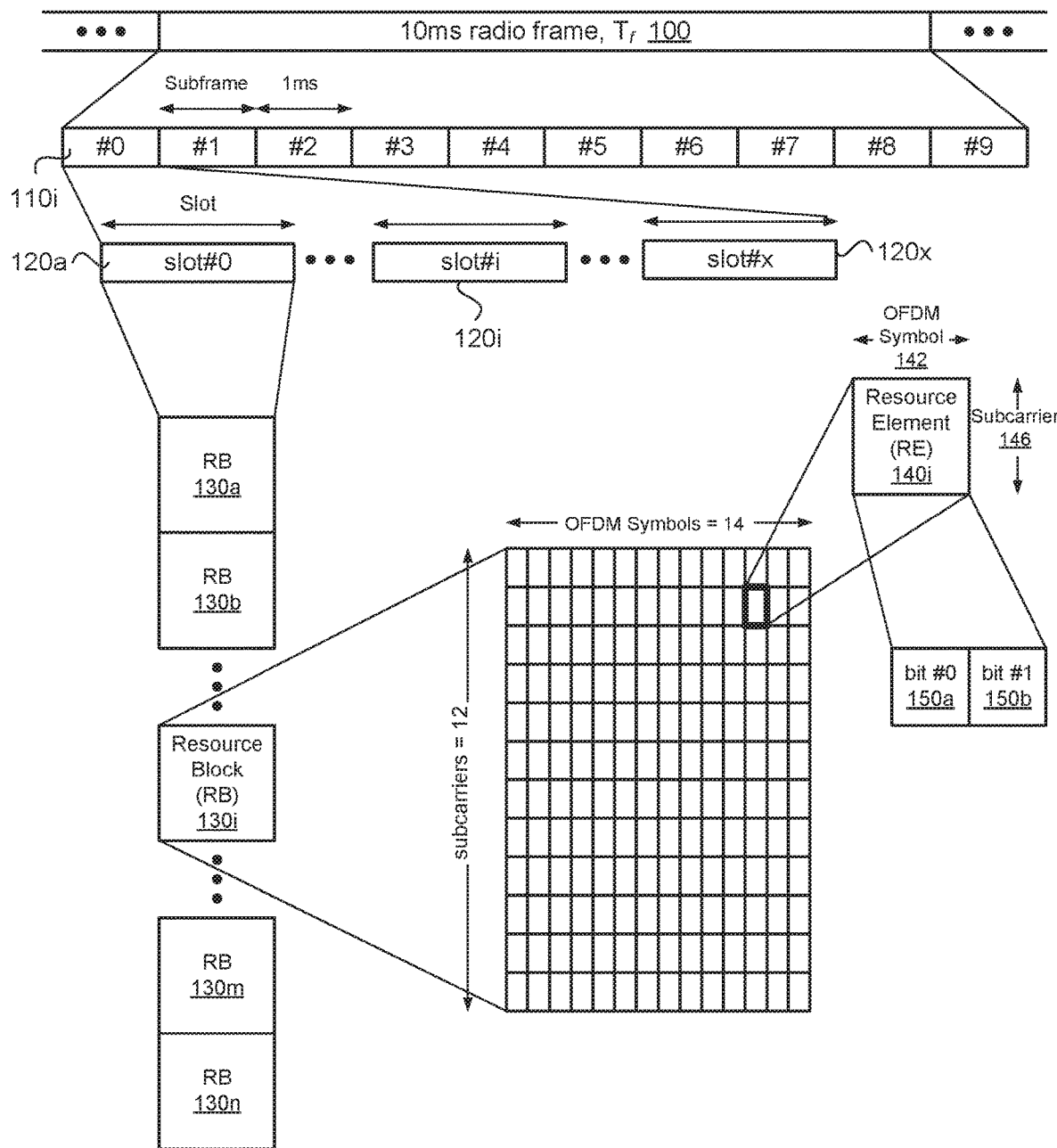
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB),"

and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into one or multiple slots 120a, 120i, and 120x, each with a duration, $T_{slot}$, of 1/μ ms, where μ=1 for 15 kHz subcarrier spacing, μ=2 for 30 kHz, μ=4 for 60 kHz, μ=8 for 120 kHz, and μ=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140i can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In one configuration, a downlink (DL) transmission efficiency and/or user equipment (UE) power consumption can be improved in Release 16 enhanced Machine Type Communication (eMTC) by specifying a quality report in message 3 (Msg3). As used herein, "Msg3" can refer to an uplink transmission from a UE to a base station over a physical uplink shared channel (PUSCH) during a random access procedure between the UE and the base station. With a similar motivation and to improve multi-carrier operation, Msg3 quality reporting for non-anchor access can also be supported in Release-16 Narrowband Internet of Things (NB-IoT).

As described in further detail below, a design is provided to support a quality report in Msg3 for eMTC and a quality report in Msg3 for non-anchor access in NB-IoT. The design provided herein includes quality report definition in terms of which metric is to be used, measurement reference resources, and Msg3 design to carry the quality report.

With respect to a previous design of a quality report in Msg3 for an anchor carrier in the Release-14 NB-IoT system, it was observed that a DL and an UL noise and interference environment could be quite different in NB-IoT systems, so an estimation of a DL channel condition only based on narrowband physical random access channel (NPRACH) coverage level would not be sufficiently accurate. To provide more accurate information on the DL channel condition, a DL channel quality was reported in Msg3 in the Release-14 NB-IoT system, as an optional feature for Release-14 NB-IoT UEs. The DL channel quality is denoted as a repetition number that a UE needs to decode a hypothetical narrowband physical downlink control channel (NPDCCH) with a block error ratio (BLER) of 1%. The indicated hypothetical NPDCCH repetition number can be derived based on averaging the DL channel quality during a period of time to average fading out, without incurring in additional wake-ups for measurement. A reference resource for the NPDCCH (e.g., the location in time of the "virtual PDCCH") is not defined, and in the previous design, this feature is only supported for the anchor carrier on which the UE receives a message 2 (Msg2).

In one configuration, DL channel quality reporting in Msg3 for eMTC and DL channel quality reporting in Msg3 for a non-anchor carrier for NB-IoT can be enabled/disabled by a master information block (MIB) or a system information block (SIB).

In one example, for eMTC, a system information block type 1 bandwidth reduced (SIB1-BR) or system information block type y bandwidth reduced (SIBy-BR) (y>1) can indicate whether UEs (that support channel quality reporting in Msg3) are expected to include a channel quality measurement report in a Msg3 transmission. Further, the channel quality reported can be specified to correspond to the NB on which the UE receives a random access response (RAR) (also referred to as message 2, or Msg2).

In one example, for NB-IoT, a master information block narrowband (MIB-NB) or system information block type x narrowband (SIBx-NB) (x=1, 2, etc.) can indicate whether a measurement report is for an anchor carrier or a non-anchor carrier. Alternatively, the UE can decide which carrier the measurement report is for. In this case, the UE can indicate whether the report is for an anchor or non-anchor in Msg3, and the non-anchor carrier can be specified to correspond to the non-anchor carrier on which the UE receives the RAR. In another example, when a non-anchor carrier is configured for RAR transmission, the UE (that supports channel quality reporting for non-anchor carrier via Msg3) can be expected to report a DL channel quality corresponding to the non-anchor carrier used to receive the RAR transmission. In yet another example, a base station can configure transmission of channel quality reporting for a non-anchor carrier in addition to or instead of reporting for an anchor carrier, applicable for UEs that support channel quality reporting for the non-anchor carrier via Msg3.

In one example, with respect to UE capability reporting from the UE, this feature can be optional for Release-16 NB-IoT/eMTC UEs, or this feature can be mandatory for Rel-16 NB-IoT/eMTC UEs. In another example, a UE can signal its capability regarding support of a measurement report in Msg3 via (N)PRACH partitioning, where the partitioning can be in sequence, time and/or frequency domain. In yet another example, Release-16 UEs supporting a feature of Early Data Transmission (EDT) can support the channel quality measurement report in the Msg3 transmission.

In one configuration, with respect to a quality report metric, a quality report can be defined in terms of narrowband received signal received power ((N)RSRP) and/or narrowband reference signal received quality ((N)RSRQ). The definition of (N)RSRP and (N)RSRQ can be the same as in legacy eMTC/NB-IoT systems. Specifically, the (N)RSRP is an average cell-specific reference signal or narrowband reference signal (CRS/NRS) power on resource elements (REs) carrying a corresponding reference signal. (N)RSRQ is (N)RSRP divided by a narrowband received signal strength indicator ((N)RSSI), where RSSI comprises s linear average power of OFDM symbols carrying an antenna port 0 reference signal for eMTC, and NRSSI comprises a linear average of a total received power from all OFDM symbols of measurement subframes for NB-IoT.

FIG. 2 illustrates an example of a first channel quality indicator (CQI) table and FIG. 3 illustrates an example of a second CQI table. In one example, a quality report can be defined as CQI. A CQI table for Release-13 eMTC (with CQI indexes 0-10 in FIG. 2), or new CQI tables introduced in Release-15 eMTC (the first table shown in FIG. 2 and the second table shown in FIG. 3) can be used. In one example, the CQI table used can be as shown in the second table of FIG. 3, with only quadrature phase shift keying (QPSK) and 16 quadrature amplitude modulation (16QAM) supported (i.e. CQI indexes 0-10). In another example, if only QPSK is supported for early data transmission (EDT) DL transmission (similar as EDT UL transmission), the CQI table used can be as shown in the first table of FIG. 2 or the second table of FIG. 3, with only QPSK rows (i.e., CQI indexes from 0 to 7). Further, in examples where the first table of FIG. 2 is used, a channel state information (CSI) source rate (RCSI) can be configured by radio resource control (RRC) (e.g., via SIB), or by a predefined mapping from an RCSI to a physical random access channel (PRACH) coverage level, or by a predefined mapping from RCSI to an Rmax, where Rmax is a configured maximum number of repetitions for type-2 CSS.

In one configuration, the quality report can be defined as a quality report in Msg3 for a NB-IoT anchor carrier, e.g. the number of repetitions that the UE needs to decode a hypothetical NPDCCH/MPDCCH with a BLER of 1%. Candidates can be defined in terms of an actual NPDCCH/MPDCCH repetition number, e.g., a subset of {1, 2, 4, 8, 16, 32, 64, 128, 192, 256, 384, 512, 1024, 1536, 2048}. In one example, a subset of candidates can be predefined or configured by RRC. The subset of candidates can be different for different (N)PRACH coverage levels. Further, the candidates can be defined in terms of a scaled Rmax, where Rmax is the maximum number of repetitions configured for type-2 CSS. A set of scaling factors can be predefined or configured by RRC, e.g., {1, ½, ¼, ⅛} or {1, ½, ¼, ⅛, 1/16, 1/32, 1/64, 1/128}. In one example, different sets of scaling factors can be defined/configured for different (N)PRACH coverage levels. In another example, different sets of scaling factors can be defined for different Rmax, e.g., {1, ½, ¼, ⅛} for small Rmax and {1, ¼, ⅛, 1/16} for large Rmax.

In one example, the number of repetitions can be a smallest value among candidate values which satisfies the hypothetical NPDCCH/MPDCCH with the BLER no more than 1%. An aggregation level (AL) can be used for the hypothetical NPDCCH/MPDCCH, and the following four options can be considered. In a first option, the AL can be specified in the 3GPP LTE specification. For example, AL=2 for NB-IoT and AL=24 for eMTC. In a second option, the AL can be determined based on the (N)PRACH coverage level. For NB-IoT, AL=1 for NPRACH coverage level 0, and AL=2 for other NPRACH coverage levels. For eMTC, AL=8 or 16 for PRACH coverage levels 0 and 1, while AL=24 for PRACH coverage levels 2 and 3. In a third option, the AL can be determined based on the Rmax for type-2 CSS. For example, AL can be 1 for Rmax<N, and AL=2 for Rmax>=N for NB-IoT, where N can be fixed in the 3GPP LTE specification or signaled via SIB. For eMTC, AL=8 for Rmax<N1, AL=16 for N1<=Rmax<N2, and AL=24 for Rmax>=N2, where N1 and N2 can be fixed in the 3GPP LTE specification or signaled via SIB. In a fourth option, the AL to be assumed can be signaled via SIB signaling. Further, the AL could be a single value, or defined as a function of the (N)PRACH coverage level, or defined as a function of Rmax configured for Type-2 CSS for MPDCCH/NPDCCH (for eMTC/NB-IoT respectively), wherein, for the last option, one or more thresholds to divide an entire range of Rmax values can be specified.

In one example, for a downlink control information (DCI) format to be assumed for a measurement, various options can be considered. For example, for NB-IoT, DCI format N1 can be assumed. Alternatively, DCI format N2 can be assumed. For eMTC, in one example, a common DCI format can be assumed for all cases. For example, DCI format 6-1A or DCI format 6-1B or DCI format 2 can be assumed. For eMTC, in another example, different DCI formats can be assumed for different PRACH coverage levels. For example, DCI format 6-1A can be assumed for PRACH coverage levels 0 and 1, while DCI format 6-1B can be assumed for PRACH coverage levels 2 and 3. For eMTC, in yet another example, different DCI formats can be assumed for different Rmax configured for Type-2 CSS for MPDCCH. For example, DCI format 6-1A can be assumed for Rmax<=N, while DCI format 6-1B can be assumed for Rmax>N, where N can be fixed in the 3GPP LTE specification (e.g., N=32) or can be signaled via SIB.

In one example, for eMTC, regarding an assumption on frequency hopping (FH) for the hypothetical MPDCCH detection, FH can be assumed to be disabled. For example, a (first) NB configured for DCI monitoring in type2-CSS can be the frequency resources for the measurement. In another example, a FH configuration can be based on the FH configured for type2-CSS.

In one example, different options can be used for eMTC and NB-IoT. For example, the quality report in Msg3 for eMTC can be denoted by CQI, while the quality report in Msg3 for a non-anchor carrier in NB-IoT can be denoted by a number of repetitions for NPDCCH with a BLER of 1%, or vice versa. Alternatively, the same option can be used for both eMTC and NB-IoT, e.g., the quality report in Msg3 for both eMTC and the non-anchor carrier in NB-IoT can be denoted by the number of repetitions for NPDCCH/MPDCCH with a BLER of 1%.

Figure 4:
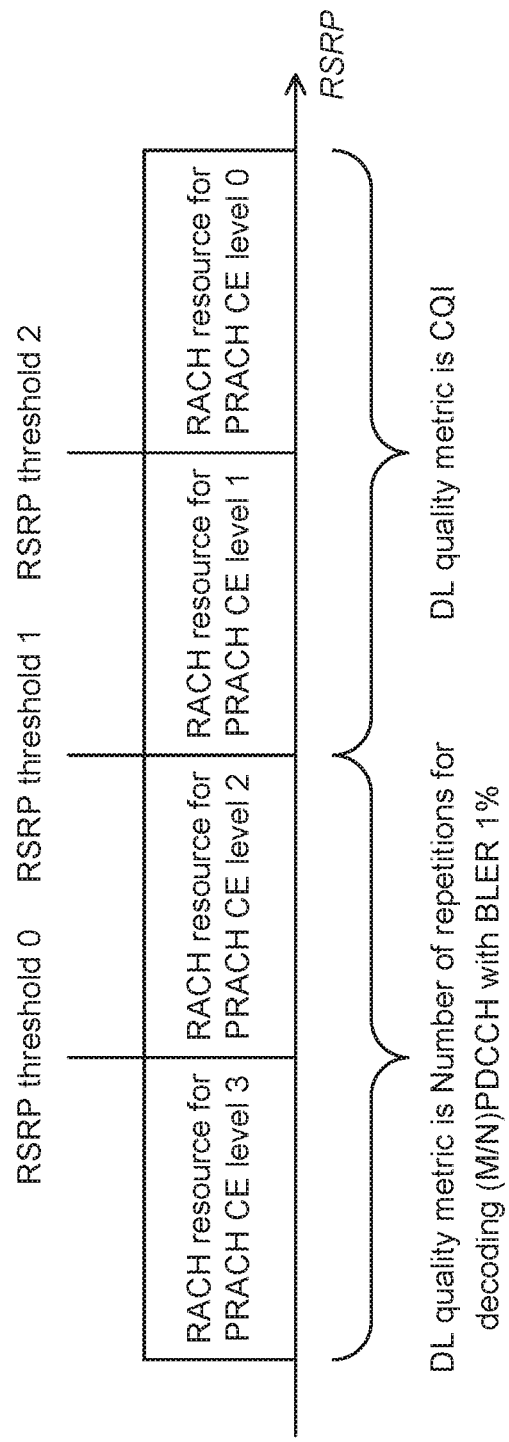
FIG. 4 illustrates physical random access channel (PRACH) coverage enhancement (CE) levels and associated downlink quality metric types in accordance with an example.

FIG. 4 illustrates an example of physical random access channel (PRACH) coverage enhancement (CE) levels and associated downlink quality metric types. For example, either CQI or a number of repetitions for decoding of (M/N)PDCCH with a BLER of 1% can be used as a DL quality metric to be reported in Msg3, and a distinction between DL quality metric types (e.g., CQI or the number of (M/N)PDCCH repetitions) can be defined as a function of the PRACH CE levels, following a Release-13 approach, as shown in FIG. 4. Specifically, a UE can report the CQI as the DL quality metric when a PRACH CE level corresponding to a successfully received Msg2 belongs to CE level 0 or 1, or can report the number of repetitions needed for decoding of the hypothetical (M/N)PDCCH with the BLER of 1%, otherwise. A unique PRACH resource can be associated with a particular PRACH CE level (based on configured RSRP thresholds). This PRACH resource can be used by the UE for a UL preamble transmission and by a base station for preamble reception. Therefore, after successful preamble reception, the base station can be aware of a kind of DL quality metric (e.g., CQI or the number of (M/N)PDCCH repetitions) used by the UE in the Msg.3 report.

In one configuration, with respect to a measurement reference resource, similar to quality reporting in Msg3 for a NB-IoT anchor carrier in Release-14, a reference resource for the quality measurement may not be defined.

In one example, similar to the definition of reference resources for CSI feedback in Release-13 eMTC, reference resources for channel quality measurements can be defined. The reference resource can span N BL/CE (for eMTC) or NB-IoT (for NB-IoT) DL subframes, where N is a positive integer satisfying N>=1. In one example, with respect to the design of parameter N, the parameter N can be predefined. For example, the parameter N can be fixed in the 3GPP LTE specification, or a mapping from N to Rmax can be defined, e.g., N=Rmax/K, where K can be 1, 2, 4, 8, etc. The parameter K can be predefined, or can depend on Rmax, e.g., K becomes larger when Rmax increases. Alternatively, the parameter N can be configured by a SIB.

In one example, with respect to a set of subframes as reference resources, a starting subframe of the set of subframes for reference resources can be defined. For example, a first subframe can be M subframes before a first subframe of the type-2 CSS, where M can be a non-negative integer such as 0, 2, or 4. In another example, a last subframe of the set of subframes for reference resources can be defined. For example, the last subframe can be L subframes before a starting subframe of the Msg3 transmission, where L is positive integer. For example, L can be 4, or L can be a delay between an end of a physical downlink shared channel (PDSCH) carrying a RAR to a start of the Msg3 transmission. L can be in terms of absolute subframes (SFs), or only counting valid DL subframes.

In one example, e.g., for eMTC, L can be 6 for frequency division duplexing (FDD) and can be equal to a parameter subframeAssignment for time division duplexing (TDD). In another example, e.g, for eMTC, different values for L can be defined, depending on whether an UL delay field in a RAR is set to 1. Specifically, L can be 6+number of Msg3 repetitions indicated by RAR for FDD and subframeAssignment+number of Msg3 repetitions indicated by RAR for TDD if the UL delay field is set to 1. In yet another example, e.g., for NB-IoT, L can be 12+D, where D is a delay for Msg3 transmission indicated by the RAR.

In one configuration, different options can be used for eMTC and NB-IoT. For example, for the NB-IoT non-anchor case, a reference resource may not be defined, while for eMTC, a reference resource can be defined based on one of the techniques described above.

In one configuration, regarding frequency resources for the measurement, for NB-IoT, a non-anchor carrier for RAR reception can be defined as the frequency domain resources for measurement. For eMTC, the NB for Type-2 CSS for MPDCCH (for RAR monitoring) can be defined as the frequency domain resources for measurement. If frequency hopping is configured for Type-2 CSS for MPDCCH for the RAR, wideband measurement can be reported.

In one configuration, a Msg3 design is described below. The Msg3 design can be applicable to eMTC, and more specifically to a first case when EDT is used and a second case when EDT is not used. In addition, the Msg3 design can be applicable to NB-IoT With respect to the Msg3 design for eMTC, measurement can be performed prior to a message 1 (Msg1). Thus, an RRC layer can obtain CE level information or measurement information from a medium access control (MAC) layer before the RRC layer constructs an RRC message and delivers to lower layers. Msg3 can include one available bit (or spare bit), which can be used to indicate the quality report. However, with this approach, a granularity for the quality report can be quite large which could diminish the benefits of supporting this feature.

Alternatively, an RRC connection request message, an RRC connection resume request message and/or an RRC connection reestablishment request message can be extended to larger size, to include an additional information element (IE) to carry the quality report.

With respect to the Msg3 design for eMTC and when EDT is used, the one spare bit can be used to indicate an IE that reports the CQI. This bit can be set to '1' to indicate that the RRC connection resume request message carries a CQI report when initiating EDT, which can increase a size of the RRC message by one byte.

FIG. 5 illustrates an example of Abstract Syntax Notation (ASN) code for a radio resource control (RRC) connection resume request message. The RRC connection resume request message can include a CQI report information element (IE), such as cqi-MPDCCH-Report-r16, which can include eight code points, e.g., cqi-report1, cqi-report2, and so on, for the case in which EDT is used.

FIG. 6 is an example of a table of field descriptions for an RRC connection resume request message. For example, the RRC connection resume request message can include 'cqi-MPDCCH', and this field can indicate a measured DL channel quality of a serving cell, and this field can be present only when used for EDT. Further, the RRC connection resume request message can include 'resumeCause', which can provide a resume cause for the RRC connection resume request as provided by upper layers. Further, the RRC connection resume request message can include 'resume- Identity', which can indicate a UE identity to facilitate UE context retrieval at a base station. Further, the RRC connection resume request message can include 'shortResumeMAC-I', which can indicate an authentication token to facilitate UE authentication at the base station FIG. 7 illustrates an example of ASN code for a radio resource control (RRC) connection resume request message. In this example, the RRC connection resume request message can include a new IE to carry a CSI report using a critical extension, for the case in which EDT is used.

FIG. 8 is an example of a table of field descriptions for an RRC connection resume request message. For example, the RRC connection resume request message can include 'cqi-MPDCCH', and this field can indicate a measured DL channel quality of a serving cell. Further, the RRC connection resume request message can include 'resumeCause', which can provide a resume cause for the RRC connection resume request as provided by upper layers. Further, the RRC connection resume request message can include 'resumeIdentity', which can indicate a UE identity to facilitate UE context retrieval at a base station. Further, the RRC connection resume request message can include 'shortResumeMAC-I', which can indicate an authentication token to facilitate UE authentication at the base station FIGS. 9 and 10 illustrate examples of ASN code for uplink common control channel (UL-CCCH) messages. In this example, a new RRC connection resume request IE can be defined to carry a CSI report using an UL-CCCH message class extension, for the case in which EDT is used. The UL-CCCH message class is a set of RRC messages that can be sent from a UE to an E-UTRAN on an uplink CCCH logical channel.

With respect to the Msg3 design for eMTC and when EDT is not used, the RRC connection reestablishment request, the RRC connection request or the RRC connection resume request message can be extended to report CQI when EDT is not used. For example, one of these RRC messages can be extended to report the CQI when EDT is not used using the UL-CCCH message class extension, or by using the critical extension of the message, or by using the one available bit (or spare bi)t in Msg 3.

In one example, to inform the network and obtain a sufficient minimum UL grant for Msg3, UE capability indication signaling can be used. The UE capability indication can be signaled from the UE using a PRACH resource via Msg1, which can result in the UE being provided with the sufficient minimum UL grant for Msg3 in a RAR, which can be larger than an existing minimum UL grant of 56 bits for LTE (and 88 bits for NB-IoT). In another option, dedicated RRC signaling can be used to signal the UE capability from the UE, and the network can broadcast in system information when the network allows a larger grant for Msg3.

In another option, when the network supports and intends to receive a CSI report in Msg3, the network can broadcast such an indication in system information (for example, MIB or SIB2, SIB2-BR or SIB2-NB), which can indicate that the network would provide a minimum sufficient UL grant (for example, 64 bits) in the RAR to receive the CQi report in Msg3, which can be larger than an existing minimum UL grant of 56 bits for LTE (or 96 bits for NB-IoT larger than minimum UL grant of 88 bit).

FIGS. 11A and 11B illustrate an example of ASN code for a system information block type 2 (SIB2). The SIB2 can include an indication to indicate that a network can provide a minimum sufficient UL grant in a RAR to receive a CQi report in Msg3, for the case in which EDT is not used. The SIB2 can include the indication when the network supports and intends to receive the CSI report in Msg3, for the case in which EDT is not used.

FIG. 12 is an example of a table of field descriptions for a SIB2. For example, the SIB2 can include 'cp-EDT', and this field can indicate if the UE is allowed to initiate CP-EDT. Further, the SIB2 can include 'cqi-ReportAllowed', and this field can indicate that a base station can process a CQI report in Msg3. Further, the SIB2 can include 'idleModeMeasurements', and this field can indicate that the base station can process an indication of IDLE mode measurements from a UE.

FIG. 13 illustrates an example of ASN code for a radio resource control (RRC) connection resume request message. In this example, the RRC connection resume request message can include a new IE to carry a CSI report using a critical extension, for the case in which EDT is not used.

In one embodiment, a UE can perform a channel quality measurement from Msg2 (RAR message). In one option, a MAC layer can indicate to an RRC layer to construct a new RRC message to include a latest measurement report from Msg2, where a sufficient gap can exist between Msg2 and Msg3 to build a new RRC message. In another option, if an UL grant in a RAR is sufficient to include a MAC control element (CE) (e.g., larger than or equal to 64 bits or when EDT is used), the UL grant can instruct a multiplexing and assembly unit to generate a channel quality report (CQR) MAC CE for inclusion in a MAC protocol data unit (PDU) for Msg3.

Figure 14:
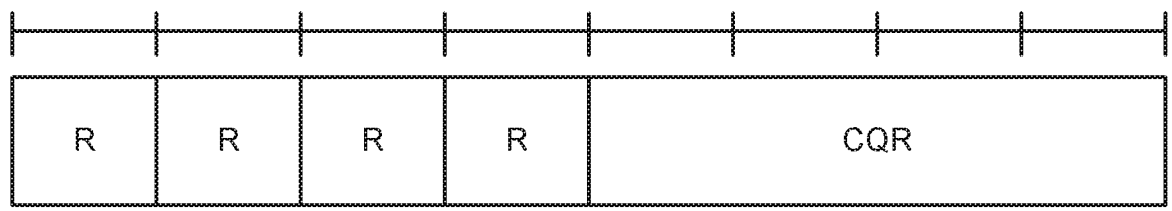
FIG. 14 illustrates a channel quality report (CQR) media access control (MAC) control element (CE) payload in accordance with an example.

FIG. 14 illustrates an example of a CQR MAC CE payload. As shown, the CQR MAC CE payload can include 4 bits that correspond to a CQR and 4 reserved bits.

In one example, when a network receives the CQR MAC CE, a MAC layer can indicate to upper layer (e.g., RRC layer) about information contained in the CQR MAC CE. In one option, the one byte CQR MAC CE can be placed before a CCCH service data unit (SDU) without any MAC CE subheader for Msg3, and can be identified by a logical channel identifier (LCID) of the CCCH SDU. In one example, the CCCH SDU can be identified using an existing CCCH LCID, as shown in FIG. 15, or can be identified by using a reserved LCID, as shown in FIG. 16.

Figure 15:
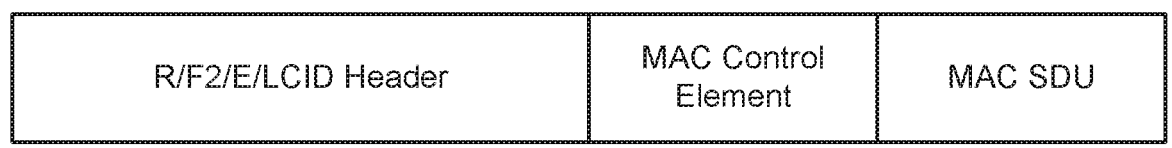
FIG. 15 illustrates a MAC protocol data unit (PDU) that includes a common control channel (CCCH) service data unit (SDU) and a CQR MAC CE in accordance with an example.

FIG. 15 illustrates an example of a MAC protocol data unit (PDU) that includes a common control channel (CCCH) service data unit (SDU) and a CQR MAC CE. For example, the MAC PDU can include an R/F2/E/LCID header, as well as a MAC payload that comprises a MAC CE and a MAC SDU.

FIG. 16 illustrates an example table of logical channel identifier (LCID) values for an uplink shared channel (UL-SCH). For example, an index of '01110' can correspond to an LCID value of 'CCCH and channel quality report', and an index of '01111' can correspond to an LCID value of 'reserved'.

In one example, the CQR MAC CE can be included in a MAC PDU (in front of the CCCH SDU) to be sent in Msg3 with a separate MAC CE subheader, which can be identified by using a reserved LCID, as shown in FIG. 17.

FIG. 17 illustrates an example table of LCID values for an UL-SCH. For example, an index of '01110' can correspond to an LCID value of 'channel quality report', and an index of '01111' can correspond to an LCID value of 'reserved'.

In one configuration, with respect to a reporting repetitions level (RL) and an aggregation level (AL), for CE Mode B, a downlink channel quality reported in Msg3 can be denoted as a repetition number that a UE recommends to achieve a hypothetical MPDCCH decoding with a BLER of 1%. Further, for CE mode A (PRACH CE level 0, 1), a downlink channel quality can be denoted as a repetition number and/or aggregation level that a UE needs to decode a hypothetical MPDCCH with a BLER of 1%.

In one example, the number of repetition levels (RL) that can be reported for MPDCCH can be 1, 2, 4, 8, 16, 32, 64, 128 and 256. The number of aggregation levels (AL) that can be reported for MPDCCH can be 8, 16 and 24.

In one example, 8 code points for RL can be used as {R1 or 2=1 or 2, R4=4, R8=8, R16=16, R32=32, R64=64, R128=128 and R256=256). Another example can include {R1=Rmax/128, R2=Rmax/64, R3=Rmax/32, R4=Rmax/16, R5=Rmax/8, R6=Rmax/4, R7=Rmax/2 and R8=Rmax). In addition, 4 code points for AL can be reported as {AL0=no reporting, AL1=8, AL2=16, AL3=24}.

In one example, if an RRC message is used to report, RL and RL can be included together with/without information of narrow bands where this measurement was taken. When information of narrowband(s) is not included, then when a frequency hopping is not enabled, a reporting corresponds to an MPDCCH for monitoring paging narrowband (PNB) or for receiving a RAR.

FIG. 18 illustrates an example of ASN code for an RRC connection resume request that includes IEs for a repetition level and an aggregation level. The RRC connection resume request can include 'repetitionLevel', which can correspond to r1 or 2, r4, r8, r16, r32, r64, r128, r256. Further, the RRC connection resume request can include 'aggregationLevel', which can correspond to AG0, AG1, AG2, AG3.

In one example, Msg4 is likely to be scheduled in a NB which is mapped directly from a paging NB. In system information, an offset to a paging narrowband can be provided, which can indicate that a base station is instructing a UE to prepare a measurement in that NB where the Msg4 transmission is likely to be scheduled. When the offset is not included, the UE can prepare a report corresponding to a paging narrowband (PNB) or NB for the RAR.

In one example, when frequency hopping is enabled, the UE can either prepare an average or best or worst of RLs and ALs of all the hopped NBs. When the UE is preparing the worst or best RLs and ALs of the NB, the UE can also include the offset to the NB indicated by mpdcch-NarrowbandsToMonitor in SIB2 for the RAR and NB is identified as (NBRAR+offset) mod NNB, where NBRAR is NB for RAR and NNB denotes a total number of NBs.

In one example, when an average report from measurements of multiple NBs is to be prepared, an indication can be used to indicate the report is an average of NBs or of a single NB. When preparing an average value, the average value can be rounded up or down to one of the closest reporting values, (e.g., an average value 10 can be reported as 8, but an average value 14 can be reported as 16). In another option, a further indication that the report is prepared for the NB used to receive the RAR or for the NB indicated by RAR can also be included in the report.

FIG. 19 illustrates an example of ASN code for an RRC connection resume request that includes IEs for a repetition level and an aggregation level. The RRC connection resume request can include 'repetitionLevel', which can correspond to R1, R2, R3, R4, R5, R6, R7, R8. Further, the RRC connection resume request can include 'aggregationLevel', which can correspond to AG0, AG1, AG2, AG3. Further, the RRC connection resume request can include 'offset', which can correspond to 0, 1, 2, 3, 4, 5, 6, 7.

FIG. 20 illustrates an example of a MAC CE that is used to convey a repetition level and an aggregation level. In this example, the MAC CE is 1 byte. An additional bit can be used to indicate if repetition field are present or not in case the UE reports only the aggregation level. In another example, four bits can be used for the repetition level to report one of the 9 code points for repetition levels (1, 2, 4, 8, 16, 32, 64, 128 and 256) plus one code point for "no reporting" and reserved code points for future use.

As shown in FIG. 20, in a first example of the MAC CE, the MAC CE can indicate only the repetition level and the aggregation level. In a second example of the MAC CE, the MAC CE can indicate further an average report of all hopped NBs (FH=1) or report of single NB (FH=0). In a third example of the MAC CE, the MAC CE can indicate further a report of a NB used to receive a RAR (NB=1) or a NB indicated in a RAR to schedule Msg4 (NB=0). In a fourth example of the MAC CE, the MAC CE can indicate further an NB offset to determine a NB where the measurement is taken.

In one configuration, two unused bits in a MAC subheader can be used. For example, 1 reserved bit can be set to "1" to indicate an "F2" field, and an "E" field can be used to report 2 bits of Msg3 quality report when an UL grant is small (e.g., 56 bits) and a length indicator is not necessitated or an additional MAC CE or SDU is not included (i.e., UL grant is sufficient to transmit only RRC connection request message or RRC connection resume request message or RRC connection reestablishment request message). In this case, 3 unused bits can also be used, such as an "R" field, "F2" field and "E" field. In another option, only a last MAC subheader can be used for this purpose. For example, if a MAC PDU has three MAC CEs (one for CCCH SDU, one for BSR MAC CE and one for padding), the "R" field in the first two MAC subheader can be set to "0" as in legacy, where as in the last MAC subheader, the "R" field can be set to "1" to carry two bits of report from the "F2" and "E" fields.

In one example, when there is fallback due to a legacy UL grant in both the EDT case or non-EDT case (i.e., legacy UL grant which cannot carry the channel quality report), 2 unused bit in the MAC sub-header when sending CCCH SDU can be used to report one of four code points (R1=Rmax/8, R1=Rmax/4, R1=Rmax/2 and R1=Rmax) of repetition level in CE mode B (i.e., when PRACH CE level 2 or 3 is used) or one of the four code points (R1=Rmax/128, R2=Rmax/64, R3=Rmax/32, R4=Rmax/16) of repetition level in CE mode A (i.e., when PRACH CE level 0 or 1 is used).

FIG. 21 illustrates an example of a table that includes PRACH CE levels used in Msg1 and corresponding repetition levels set for 2 bits. For example, the PRACH CE level used in Msg1 can be 0, 1, 2, or 3. The repetition levels set for 2 bits (four code points) can be {1, 2, 4, 8}, {4, 8, 16, 32}, {16, 32, 64, 128} or {32, 64, 128, 256}.

In one example, a new reserved LCID can be used if 2 bits of quality report plus one CCCH SDU are together with a short BSR, or padding bits or truncated BSR can be used in place of the short BSR.

In one configuration, with respect to the Msg3 design for NB-IoT, there can be at least 3 spare bits in Msg3 for NB-IoT. Similar to the quality report for the anchor-carrier in NB-IoT, the spare bits can be used to carry the quality report for the non-anchor case. In the past, a NB-IoT UE only provides a serving cell measurement report in an anchor carrier. However, when the UE initiates a RACH procedure, a selection of a PRACH resource in the anchor or non-anchor carrier can depend on a probability configured by nprach-Probability Anchor.

In one example, the measurement can be performed before Msg1 and an RRC message can include the channel quality report to be sent in Msg3. In this case, one spare bit in the RRC message can be used to indicate that the existing report cqi-NPDCCH carries a report for the anchor carrier or the non-anchor carrier. In another option, the RRC message can be extended (using UL CCCH message class extension or critical extension of RRC message or extension using a spare bit) in a similar manner previously described for eMTC. Whether or not the UE needs to provide the channel quality report for the non-anchor carrier can be indicated by the network via a broadcast message. For this purpose, a spare bit in a MIB can be used, or the indication can be sent in a SIB2-NB.

In one example, the measurement can be performed using a NPDCCH for the Msg2. An UL grant for Msg3 can be provided sufficiently large, and a gap between Msg2 and Msg3 can be provided sufficiently long enough for the measurement, and can indicate to upper layers (RRC layers) to construct a new extended RRC message including the measurement report and deliver the RRC message to lower layer for transmission.

In one example, a new RRC and MAC interaction model can be defined, and similar RRC and MAC interaction modeling can also be applicable to eMTC. For example, when the network has indicated in a broadcast (MIB or SIB2-NB) message that a channel quality report measured for Msg2 is allowed to be sent in Msg3 or is processed, then the RRC layer can delay the construction of RRC message. The RRC layer can indicate to the MAC layer to initiate a random access procedure. The MAC layer can initiate the RACH procedure by selecting an appropriate PRACH resource for a selected CE level and carrier (anchor or non-anchor carrier). When the UE receives a RAR intended for the UE, the MAC layers indicates to the RRC layer about the measurement report. The RRC layer can construct a new extended RRC message for RRC connection establishment including the measurement report provided by the MAC layer, which can be delivered to the MAC layer for transmission. In one example, the RRC message can be extended using an UL CCCH message class extension or critical extension of RRC message or extension using a spare bit. In another example, a spare bit in the RRC message can be set to "1" to indicate an existing field "cqi-NPDCCH" in the RRC message includes the report for the non-anchor DL carrier used to start RACH. In yet another example, a spare bit in the RRC message can be set to "1" to indicate the existing field "cqi-NPDCCH" in the RRC message includes the report for same DL carrier used for Msg2.

In one example, a new channel quality report (CQR) MAC CE can be defined and included in the MAC PDU mandatorily in front of the CCCH SDU together with a DPR MAC CE to be sent in Msg3, which can increase a minimum required UL grant size from 88 bits to 96 bits. In another example, the CQR MAC CE can be optionally included in the MAD PDU (i.e., when UL grant size is equal to or greater than 96 bits) by using a reserved LCID to identify the MAC header for CCCH and DPR (or extended DPR) MAC CE and CQR MAC CE.

In one example, a new reserved LCID can be used in the MAC CE subheader to identify the CQR MAC CE to be multiplexed with the CCCH SDU.

In one configuration, measurement resources may not be restricted, and which DL subframes are to be measured can depend on UE implementation. In another example, the measurement resources can be defined similar as in Release-14 NB-IoT. For example, there can be two measurement periods: T1 and T2. T1 can refer to a period used for (N)RSRP estimation for a (N)PRACH CE level decision, or a period before a NPRACH transmission for the non-anchor NB-IoT case. T2 can refer to a period from a beginning of Msg2 reception to a beginning of Msg3 transmission. Either T1 or T2 can be defined for the measurement, or alternatively, the use of T1 and/or T2 can depend on UE implementation. If T1 is used for the NB-IoT non-anchor case, a measurement gap can be defined to allow UEs to switch to the non-anchor carrier for measurement before the NPRACH transmission. For T2, a gap can be defined between Msg2 and Msg3 to allow sufficient time for UEs to construct the measurement report, especially for the cases where the measurement report is carried in an RRC message which needs to be re-constructed.

In one configuration, various mechanisms are described for determining a Msg3 transport block size (TBS). For example, for systems that support DL quality reporting in Msg3, various mechanisms can be considered regarding the TBS for Msg3. In one example, if the UE signals a capability to support the DL quality report (e.g. via (N)PRACH), the base station can schedule a larger Msg3 TBS for the UEs that support the DL quality report to accommodate the number of bits for the DL quality report. In another example, for cases where the base station is not aware of the UE capability regarding the DL quality report, the base station can always schedule a larger Msg3 TBS if the DL quality report in Msg3 is supported. The UEs not supporting the DL quality report can transmit padding bits to fit the scheduled TBS. In yet another example, for cases where the base station is not aware of the UE capability regarding the DL quality report, the base station can schedule both the Msg3 TBS with and without the DL quality report, and the UE can select which TBS to be used depending on whether the DL quality report is transmitted. In this case, the base station can blindly detect whether the UE carries the DL quality report.

In one example, for the resource allocation, allocated resources can be the same for Msg3 with and without the DL quality report, considering that the number of additional bits for the quality report can be quite small compared to the number of bits for Msg3 without the DL quality report, especially for the EDT case. In another example, frequency domain resources can be the same for Msg3 with and without the DL quality report, while the number of repetitions can be scaled depending on the different TBSs. Further, T1 can denote the TBS for Msg3 without the DL quality report, and T2 can denote the TBS for Msg3 with the DL quality report. The number of repetitions indicated by the UL grant in the RAR can be applied to the Msg3 without the DL quality report, denoted by R. The number of repetitions for Msg3 with the DL quality report can be the value from the supported number of repetitions which is closest to and no less than ceil(T2/T1*R).

In one example, a modulation scheme and number of RUs in a NB-IoT network can follow what is indicated by an UL grant in the RAR for both Msg3 with and without the DL quality report.

In one example, for EDT cases, as the base station can already perform blind detection for up to 4 possible TBSs for Msg3 with EDT and without the DL quality report, to reduce the complexity at the base station side, when the DL quality report is supported, the number of TBS to be selected by UEs considering EDT and the DL quality report can be limited to up to 4. For example, based on the maximum TBS broadcasted by the SIB for EDT without the DL quality report, denoted by TBS0, a smaller TBS TBS1 can be defined (e.g., TBS1 can be the supported TBS closed to TBS0/2 or TBS1 can be selected from the agreed TBS table for EDT in Rel-15 eMTC/NB-IoT), and TBS0 and TBS1 can be selected by UEs who does not support DL quality report, while TBS0' and TBS1' can be selected by the UEs who will transmit the DL quality report in Msg3, where TBS0' and TBS1' can be predefined based on TBS0. In some examples, for certain TBS0, there may not exist TBS1 (e.g. when TBS0=328 bits). In this case, the UE can select either TBS0 or TBS0' depending on whether the DL quality report is carried in Msg3 by the UE.

In one example, for retransmission, the UE can use the same TBS as previous transmission of Msg3 scheduled by the RAR. The number of repetitions can be scaled in the same way as for an initial transmission.

In one configuration, a DCI format for scheduling retransmission of Msg3 can be used to indicate to the UE to transmit a legacy Msg3 to fallback to non-DL quality report Msg3 transmission. For NB-IoT, the DCI format can indicate a TBS of 88 bits, which implies that the transmission of Msg3 fallback to legacy Msg3 without EDT and without DL quality report. For eMTC, as an alternative, one unused modulation and coding scheme (MCS) state can be used to indicate the fallback without a DL quality report. For the EDT case, two unused states can be used, one for fallback without DL quality report but with EDT, and the other for fallback with DL quality and without EDT. The unused state for EDT to fallback to legacy Msg3 in Rel-15 eMTC can be reused to indicate fallback without DL quality report and without EDT.

In one configuration, a design of DL channel quality reporting in Msg3 for eMTC and DL channel quality reporting in Msg3 for a non-anchor carrier for NB-IoT is described. In one example, the DL channel quality reporting in Msg3 for eMTC and DL channel quality reporting in Msg3 for non-anchor carrier for NB-IoT can be enabled or disabled by a MIB or SIB. In another example, for NB-IoT, the MIB-NB or SIBx-NB (e.g. x=1, 2, or etc.) can indicate whether the DL channel quality reporting in Msg3 is for the anchor and/or non-anchor carrier. In yet another example, the DL channel quality reporting metric can be (N)RSRP and/or (N)RSRQ.

In one example, the DL channel quality reporting metric can be CQI, where the CSI table for Release-13 eMTC or new CQI table introduced in Release-15 eMTC can be used. A parameter used in Release-13 eMTC CQI table RCSI can be configured by RRC (e.g., via SIB), or a predefined mapping from a RCSI to a PRACH coverage level, or a predefined mapping from the RCSI to Rmax can be used, where Rmax is the configured maximum number of repetitions for type-2 CSS.

In one example, the DL channel quality reporting metric can be a number of repetitions needed for NPDCCH/MPDDCH detection with a BLER of 1%. In another example, reporting metric candidates can be defined in terms of an actual NPDCCH/MPDCCH repetition number, or in terms of a scaled Rmax, where Rmax is the configured maximum number of repetitions for type-2 CSS. In yet another example, an AL to be used for hypothetical NPDCCH/MPDCCH detection can be specified in the 3GPP LTE specification, based on (N)PRACH coverage level, based on Rmax where Rmax is the configured maximum number of repetitions for type-2 CSS, or be indicated by SIB signaling. In a further example, for NB-IoT, a DCI format N1 can be assumed, while for eMTC, a common DCI format can be assumed or the DCI format to be assumed can depend on PRACH coverage level or Rmax for type-2 CSS.

In one example, measurement resources are not defined. In another example, the measurement resources can be defined as N BL/CE (for eMTC) or NB-IoT (for NB-IoT) DL subframes. In yet another example, reserved bit(s) in Msg3 can be used for DL channel reporting, or an RRC message can be extended to include an additional IE to carry the quality report, or a dedicated MAC CE can be included in Msg3 to carry the quality report. In a further example, the measurement resources are not restricted and are up to UE implementation.

In one example, the measurement resources can be defined similar as in Release-14 NB-IoT, where a period used for (N)RSRP estimation for (N)PRACH CE level decision, and/or a period from the beginning of Msg2 reception to the beginning of Msg3 transmission can be defined as the measurement resources. In another example, a base station can schedule a larger TBS for Msg3 if the base station enables the DL channel quality reporting, or the base station scheduling supports multiple TBS values (some for Msg3 with DL channel quality reporting and some for Msg3 without DL channel quality reporting), and it can be up to UE to select which TBS to be used. In yet another example, for retransmission of Msg3, the UE can use the same TBS as a previous transmission, or a DCI format for scheduling of retransmission can be used to indicate UE to transmit a legacy Msg3 to fallback to a non-DL quality report Msg3 transmission.

In one example, a particular kind of DL quality metric for a UE report in Msg3 is associated with PRACH CE levels. In another example, the CQI can correspond to the PRACH CE level 0 or 1, and the number of repetitions needed for decoding of hypothetical (M/N)PDCCH with a BLER of 1%, otherwise.

Figure 22:
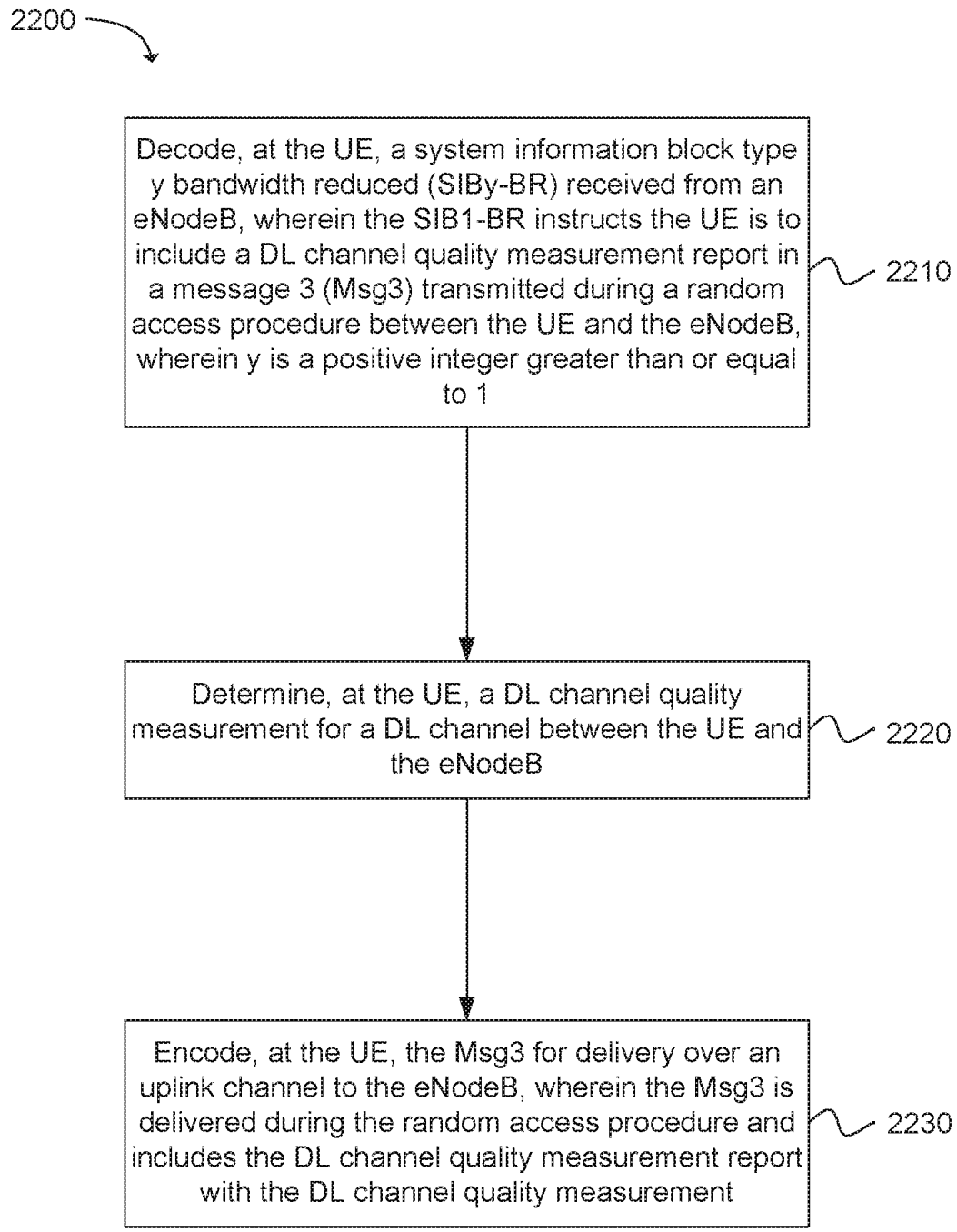
FIG. 22 depicts functionality of a user equipment (UE) operable to perform downlink (DL) channel quality measurement reporting in accordance with an example.

Another example provides functionality 2200 of a user equipment (UE) operable to perform downlink (DL) channel quality measurement reporting, as shown in FIG. 22. The UE can comprise one or more processors configured to decode, at the UE, a system information block type y bandwidth reduced (SIBy-BR) received from an eNodeB, wherein the SIB1-BR instructs the UE is to include a DL channel quality measurement report in a message 3 (Msg3) transmitted during a random access procedure between the UE and the eNodeB, wherein y is a positive integer greater than or equal to 1, as in block 2210. The UE can comprise one or more processors configured to determine, at the UE, a DL channel quality measurement for a DL channel between the UE and the eNodeB, as in block 2220. The UE can comprise one or more processors configured to encode, at the UE, the Msg3 for delivery over an uplink channel to the eNodeB, wherein the Msg3 is delivered during the random access procedure and includes the DL channel quality measurement report with the DL channel quality measurement, as in block 2230. In addition, the UE can comprise a memory interface configured to retrieve from a memory the DL channel quality measurement report.

Figure 23:
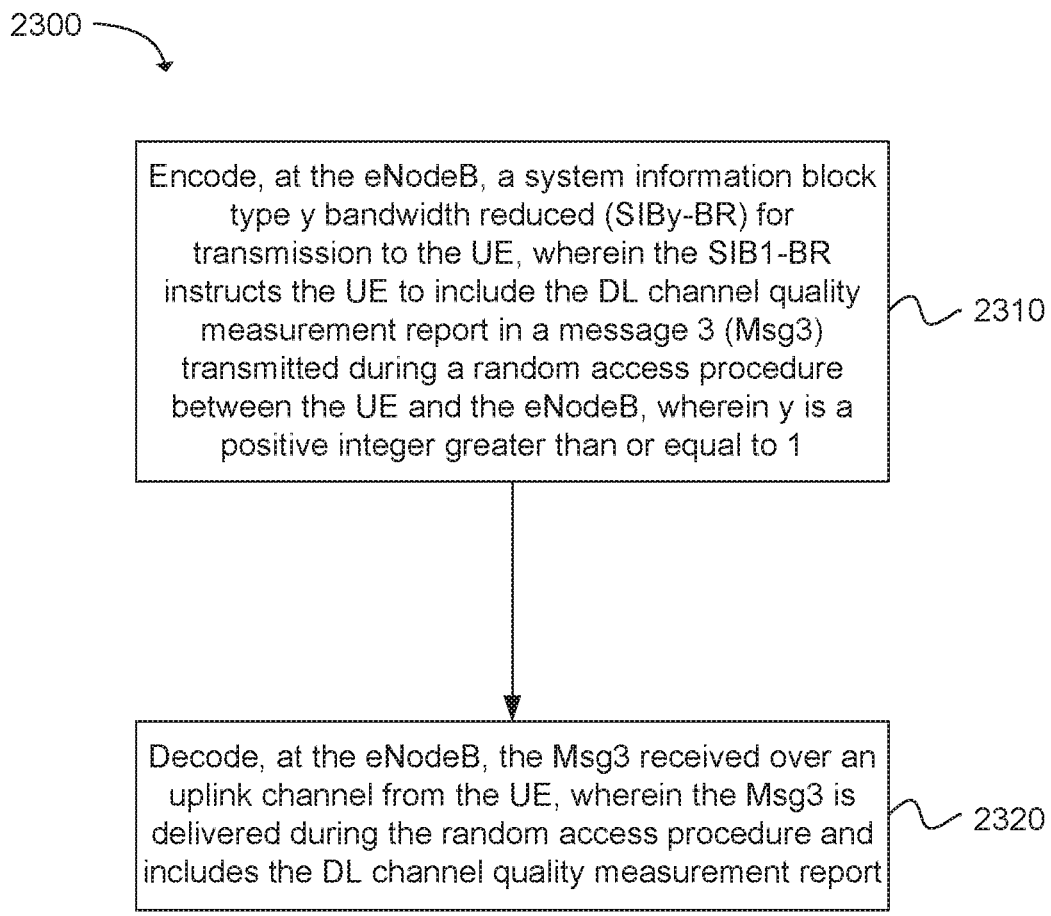
FIG. 23 depicts functionality of a Next Generation NodeB (gNB) operable to decode a downlink (DL) channel quality measurement report received from a user equipment (UE) in accordance with an example.

Another example provides functionality 2300 of an eNodeB operable to decode a downlink (DL) channel quality measurement report received from a user equipment (UE), as shown in FIG. 23. The eNodeB can comprise one or more processors configured to encode, at the eNodeB, a system information block type y bandwidth reduced (SIBy-BR) for transmission to the UE, wherein the SIB1-BR instructs the UE to include the DL channel quality measurement report in a message 3 (Msg3) transmitted during a random access procedure between the UE and the eNodeB, wherein y is a positive integer greater than or equal to 1, as in block 2310. The eNodeB can comprise one or more processors configured to decode, at the eNodeB, the Msg3 received over an uplink channel from the UE, wherein the Msg3 is delivered during the random access procedure and includes the DL channel quality measurement report, as in block 2320. In addition, the eNodeB can comprise a memory interface configured to send to a memory the DL channel quality measurement report.

Figure 24:
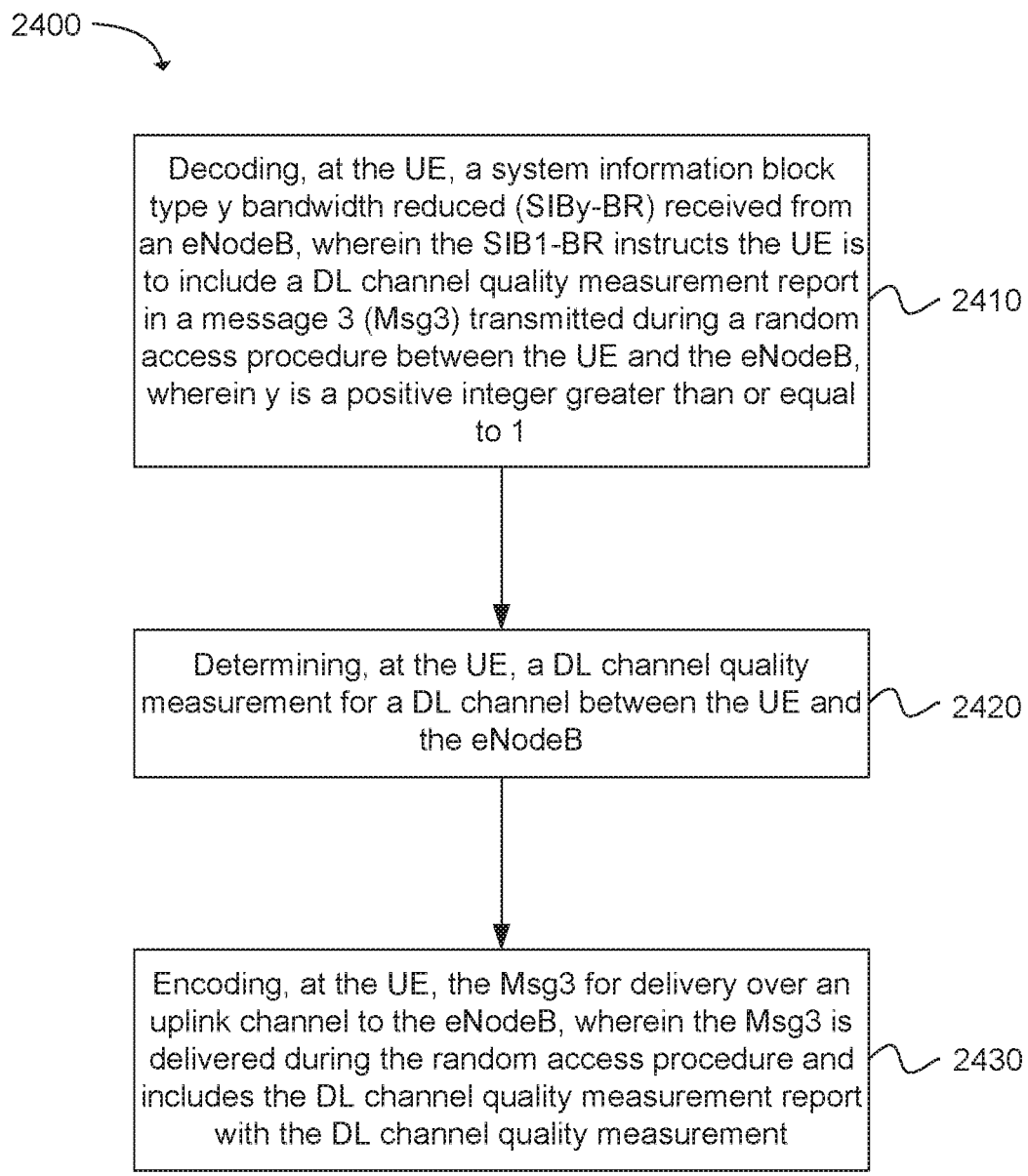
FIG. 24 depicts a flowchart of a machine readable storage medium having instructions embodied thereon for performing downlink (DL) channel quality measurement reporting at a user equipment (UE) in accordance with an example.

Another example provides at least one machine readable storage medium having instructions 2400 embodied thereon for performing downlink (DL) channel quality measurement reporting at a user equipment (UE), as shown in FIG. 24. The instructions can be executed on a machine, where the instructions are included on at least one computer readable medium or one non-transitory machine readable storage medium. The instructions when executed by one or more processors of the UE perform: decoding, at the UE, a system information block type y bandwidth reduced (SIBy-BR) received from an eNodeB, wherein the SIB1-BR instructs the UE is to include a DL channel quality measurement report in a message 3 (Msg3) transmitted during a random access procedure between the UE and the eNodeB, wherein y is a positive integer greater than or equal to 1, as in block 2410. The instructions when executed by one or more processors of the UE perform: determining, at the UE, a DL channel quality measurement for a DL channel between the UE and the eNodeB, as in block 2420. The instructions when executed by one or more processors of the UE perform: encoding, at the UE, the Msg3 for delivery over an uplink channel to the eNodeB, wherein the Msg3 is delivered during the random access procedure and includes the DL channel quality measurement report with the DL channel quality measurement, as in block 2430.

Figure 25:
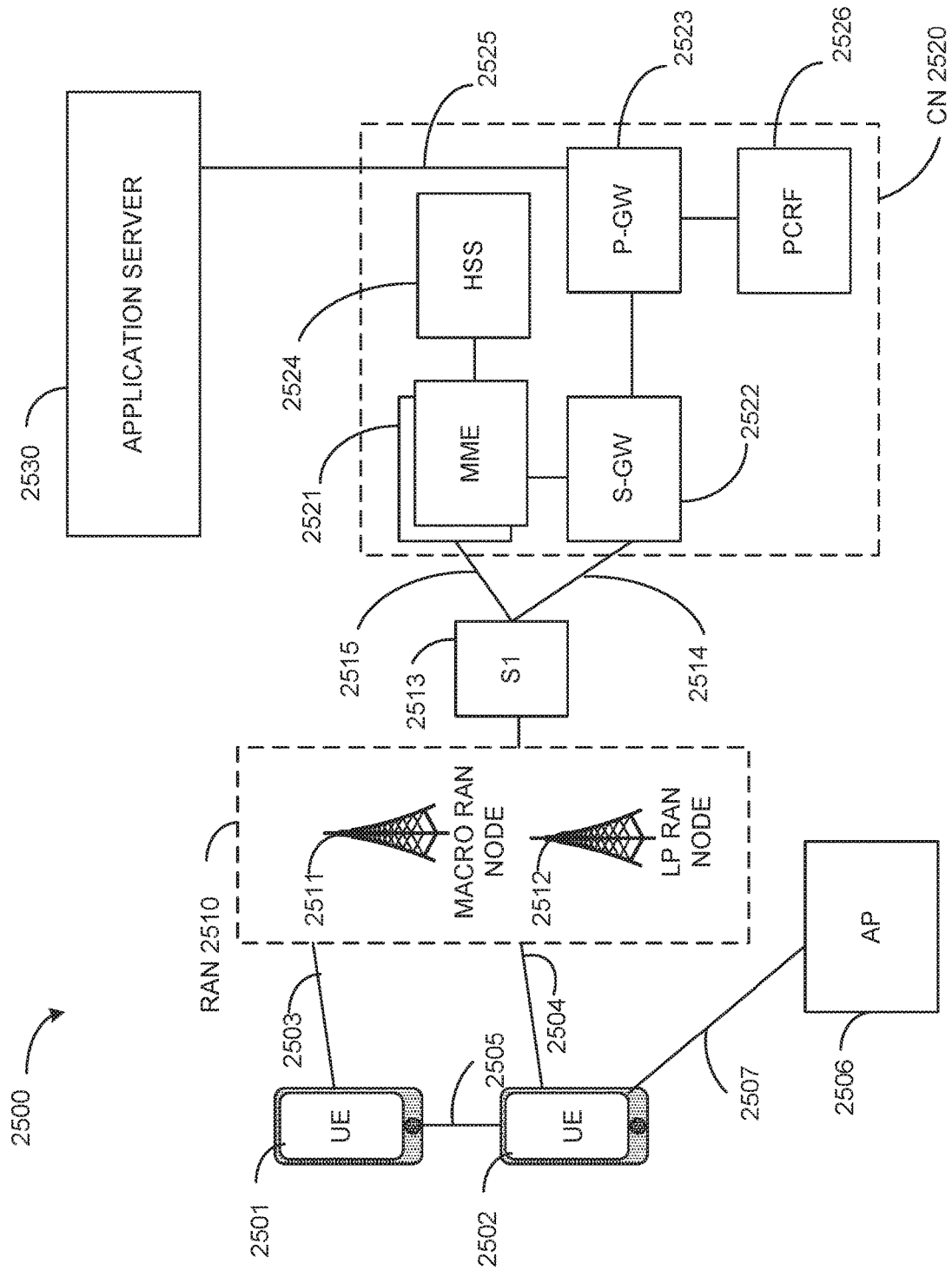
FIG. 25 illustrates an architecture of a wireless network in accordance with an example.

FIG. 25 illustrates an architecture of a system 2500 of a network in accordance with some embodiments. The system 2500 is shown to include a user equipment (UE) 2501 and a UE 2502. The UEs 2501 and 2502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 2501 and 2502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 2501 and 2502 may be configured to connect, e.g., communicatively couple, with a radio access network (RAN) 2510—the RAN 2510 may be, for example, an Evolved Universal Mobile Telecommunications System (UMTS) Terrestrial Radio Access Network (E-UTRAN), a NextGen RAN (NG RAN), or some other type of RAN. The UEs 2501 and 2502 utilize connections 2503 and 2504, respectively, each of which comprises a physical communications interface or layer (discussed in further detail below); in this example, the connections 2503 and 2504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 2501 and 2502 may further directly exchange communication data via a ProSe interface 2505. The ProSe interface 2505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 2502 is shown to be configured to access an access point (AP) 2506 via connection 2507. The connection 2507 can comprise a local wireless connection, such as a connection consistent with any IEEE 2602.15 protocol, wherein the AP 2506 would comprise a wireless fidelity (WiFi®) router. In this example, the AP 2506 is shown to be connected to the Internet without connecting to the core network of the wireless system (described in further detail below).

The RAN 2510 can include one or more access nodes that enable the connections 2503 and 2504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 2510 may include one or more RAN nodes for providing macrocells, e.g., macro RAN node 2511, and one or more RAN nodes for providing femtocells or picocells (e.g., cells having smaller coverage areas, smaller user capacity, or higher bandwidth compared to macrocells), e.g., low power (LP) RAN node 2512.

Any of the RAN nodes 2511 and 2512 can terminate the air interface protocol and can be the first point of contact for the UEs 2501 and 2502. In some embodiments, any of the RAN nodes 2511 and 2512 can fulfill various logical functions for the RAN 2510 including, but not limited to, radio network controller (RNC) functions such as radio bearer management, uplink and downlink dynamic radio resource management and data packet scheduling, and mobility management.

In accordance with some embodiments, the UEs 2501 and 2502 can be configured to communicate using Orthogonal Frequency-Division Multiplexing (OFDM) communication signals with each other or with any of the RAN nodes 2511 and 2512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 2511 and 2512 to the UEs 2501 and 2502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 2501 and 2502. The physical downlink control channel (PDCCH) may carry information about the transport format and resource allocations related to the PDSCH channel, among other things. It may also inform the UEs 2501 and 2502 about the transport format, resource allocation, and H-ARQ (Hybrid Automatic Repeat Request) information related to the uplink shared channel. Typically, downlink scheduling (assigning control and shared channel resource blocks to the UE 2502 within a cell) may be performed at any of the RAN nodes 2511 and 2512 based on channel quality information fed back from any of the UEs 2501 and 2502. The downlink resource assignment information may be sent on the PDCCH used for (e.g., assigned to) each of the UEs 2501 and 2502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 26).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 2510 is shown to be communicatively coupled to a core network (CN) 2520—via an SI interface 2513. In embodiments, the CN 2520 may be an evolved packet core (EPC) network, aNextGen Packet Core (NPC) network, or some other type of CN. In this embodiment the SI interface 2513 is split into two parts: the S1-U interface 2514, which carries traffic data between the RAN nodes 2511 and 2512 and the serving gateway (S-GW) 2522, and the SI-mobility management entity (MME) interface 2515, which is a signaling interface between the RAN nodes 2511 and 2512 and MMEs 2521.

In this embodiment, the CN 2520 comprises the MMEs 2521, the S-GW 2522, the Packet Data Network (PDN) Gateway (P-GW) 2523, and a home subscriber server (HSS) 2524. The MMEs 2521 may be similar in function to the control plane of legacy Serving General Packet Radio Service (GPRS) Support Nodes (SGSN). The MMEs 2521 may manage mobility aspects in access such as gateway selection and tracking area list management. The HSS 2524 may comprise a database for network users, including subscription-related information to support the network entities' handling of communication sessions. The CN 2520 may comprise one or several HSSs 2524, depending on the number of mobile subscribers, on the capacity of the equipment, on the organization of the network, etc. For example, the HSS 2524 can provide support for routing/roaming, authentication, authorization, naming/addressing resolution, location dependencies, etc.

The S-GW 2522 may terminate the SI interface 2513 towards the RAN 2510, and routes data packets between the RAN 2510 and the CN 2520. In addition, the S-GW 2522 may be a local mobility anchor point for inter-RAN node handovers and also may provide an anchor for inter-3GPP mobility. Other responsibilities may include lawful intercept, charging, and some policy enforcement.

The P-GW 2523 may terminate an SGi interface toward a PDN. The P-GW 2523 may route data packets between the EPC network 2523 and external networks such as a network including the application server 2530 (alternatively referred to as application function (AF)) via an Internet Protocol (IP) interface 2525. Generally, the application server 2530 may be an element offering applications that use IP bearer resources with the core network (e.g., UMTS Packet Services (PS) domain, LTE PS data services, etc.). In this embodiment, the P-GW 2523 is shown to be communicatively coupled to an application server 2530 via an IP communications interface 2525. The application server 2530 can also be configured to support one or more communication services (e.g., Voice-over-Internet Protocol (VoIP) sessions, PTT sessions, group communication sessions, social networking services, etc.) for the UEs 2501 and 2502 via the CN 2520.

The P-GW 2523 may further be a node for policy enforcement and charging data collection. Policy and Charging Enforcement Function (PCRF) 2526 is the policy and charging control element of the CN 2520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 2526 may be communicatively coupled to the application server 2530 via the P-GW 2523. The application server 2530 may signal the PCRF 2526 to indicate a new service flow and select the appropriate Quality of Service (QoS) and charging parameters. The PCRF 2526 may provision this rule into a Policy and Charging Enforcement Function (PCEF) (not shown) with the appropriate traffic flow template (TFT) and QoS class of identifier (QCI), which commences the QoS and charging as specified by the application server 2530.

Figure 26:
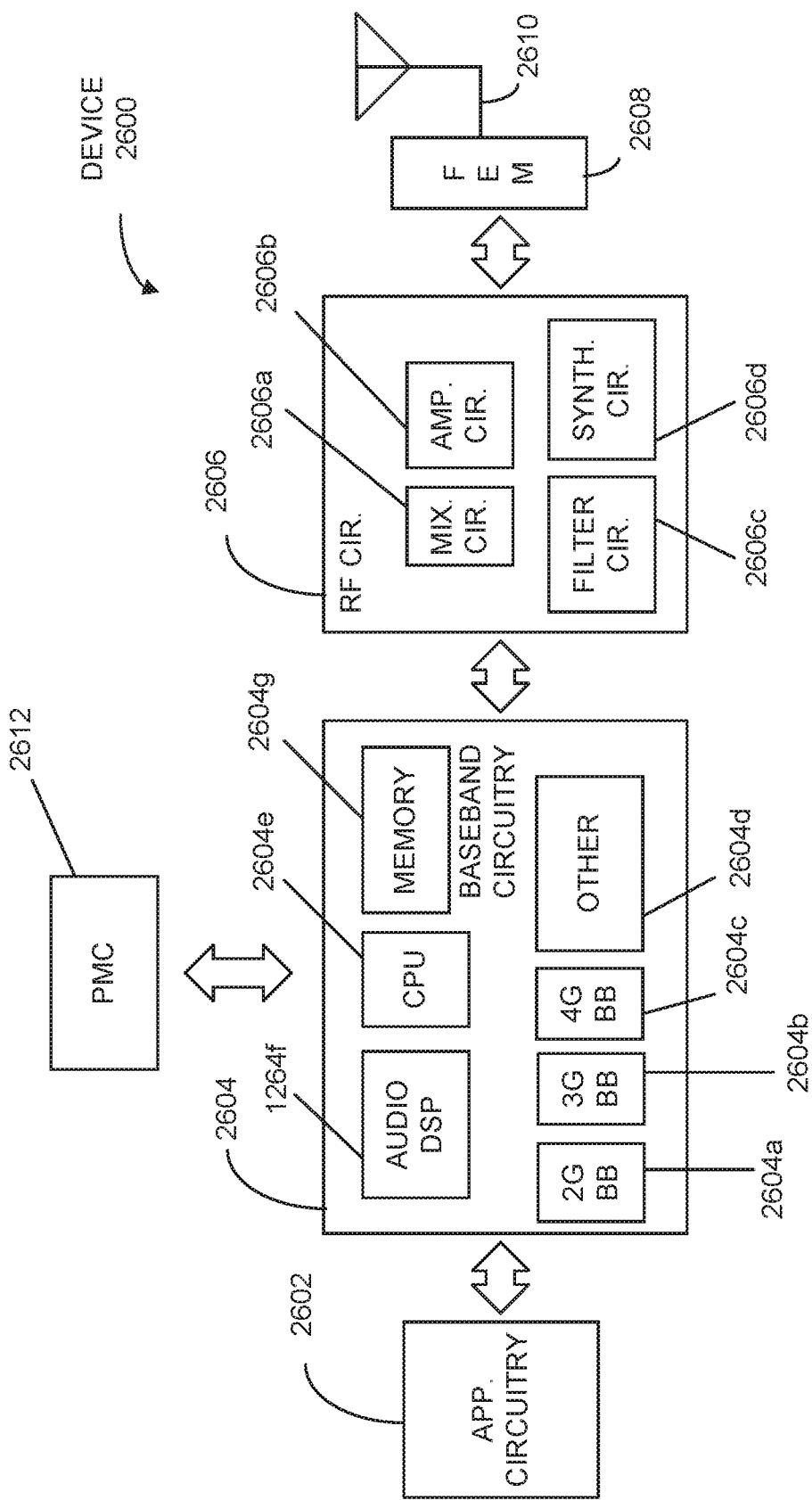
FIG. 26 illustrates a diagram of a wireless device (e.g., UE) in accordance with an example.

FIG. 26 illustrates example components of a device 2600 in accordance with some embodiments. In some embodiments, the device 2600 may include application circuitry 2602, baseband circuitry 2604, Radio Frequency (RF) circuitry 2606, front-end module (FEM) circuitry 2608, one or more antennas 2610, and power management circuitry (PMC) 2612 coupled together at least as shown. The components of the illustrated device 2600 may be included in a UE or a RAN node. In some embodiments, the device 2600 may include less elements (e.g., a RAN node may not utilize application circuitry 2602, and instead include a processor/controller to process IP data received from an EPC). In some embodiments, the device 2600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2602 may include one or more application processors. For example, the application circuitry 2602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2600. In some embodiments, processors of application circuitry 2602 may process IP data packets received from an EPC.

The baseband circuitry 2604 may include circuitry such as, but not limited to, one or more single-core or multi-core processors. The baseband circuitry 2604 may include one or more baseband processors or control logic to process baseband signals received from a receive signal path of the RF circuitry 2606 and to generate baseband signals for a transmit signal path of the RF circuitry 2606. Baseband processing circuitry 2604 may interface with the application circuitry 2602 for generation and processing of the baseband signals and for controlling operations of the RF circuitry 2606. For example, in some embodiments, the baseband circuitry 2604 may include a third generation (3G) baseband processor 2604a, a fourth generation (4G) baseband processor 2604b, a fifth generation (5G) baseband processor 2604c, or other baseband processor(s) 2604d for other existing generations, generations in development or to be developed in the future (e.g., second generation (2G), sixth generation (6G), etc.). The baseband circuitry 2604 (e.g., one or more of baseband processors 2604a-d) may handle various radio control functions that enable communication with one or more radio networks via the RF circuitry 2606. In other embodiments, some or all of the functionality of baseband processors 2604a-d may be included in modules stored in the memory 2604g and executed via a Central Processing Unit (CPU) 2604e. The radio control functions may include, but are not limited to, signal modulation/demodulation, encoding/decoding, radio frequency shifting, etc. In some embodiments, modulation/demodulation circuitry of the baseband circuitry 2604 may include Fast-Fourier Transform (FFT), precoding, or constellation mapping/demapping functionality. In some embodiments, encoding/decoding circuitry of the baseband circuitry 2604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2604 may include one or more audio digital signal processor(s) (DSP) 2604f. The audio DSP(s) 2604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2604 and the application circuitry 2602 may be implemented together such as, for example, on a system on a chip (SOC).

In some embodiments, the baseband circuitry 2604 may provide for communication compatible with one or more radio technologies. For example, in some embodiments, the baseband circuitry 2604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 2604 is configured to support radio communications of more than one wireless protocol may be referred to as multi-mode baseband circuitry.

RF circuitry 2606 may enable communication with wireless networks using modulated electromagnetic radiation through a non-solid medium. In various embodiments, the RF circuitry 2606 may include switches, filters, amplifiers, etc. to facilitate the communication with the wireless network. RF circuitry 2606 may include a receive signal path which may include circuitry to down-convert RF signals received from the FEM circuitry 2608 and provide baseband signals to the baseband circuitry 2604. RF circuitry 2606 may also include a transmit signal path which may include circuitry to up-convert baseband signals provided by the baseband circuitry 2604 and provide RF output signals to the FEM circuitry 2608 for transmission.

In some embodiments, the receive signal path of the RF circuitry 2606 may include mixer circuitry 2606a, amplifier circuitry 2606b and filter circuitry 2606c. In some embodiments, the transmit signal path of the RF circuitry 2606 may include filter circuitry 2606c and mixer circuitry 2606a. RF circuitry 2606 may also include synthesizer circuitry 2606d for synthesizing a frequency for use by the mixer circuitry 2606a of the receive signal path and the transmit signal path. In some embodiments, the mixer circuitry 2606a of the receive signal path may be configured to down-convert RF signals received from the FEM circuitry 2608 based on the synthesized frequency provided by synthesizer circuitry 2606d. The amplifier circuitry 2606b may be configured to amplify the down-converted signals and the filter circuitry 2606c may be a low-pass filter (LPF) or band-pass filter (BPF) configured to remove unwanted signals from the down-converted signals to generate output baseband signals. Output baseband signals may be provided to the baseband circuitry 2604 for further processing. In some embodiments, the output baseband signals may be zero-frequency baseband signals, although this is not a requirement. In some embodiments, mixer circuitry 2606a of the receive signal path may comprise passive mixers, although the scope of the embodiments is not limited in this respect.

In some embodiments, the mixer circuitry 2606a of the transmit signal path may be configured to up-convert input baseband signals based on the synthesized frequency provided by the synthesizer circuitry 2606d to generate RF output signals for the FEM circuitry 2608. The baseband signals may be provided by the baseband circuitry 2604 and may be filtered by filter circuitry 2606c.

In some embodiments, the mixer circuitry 2606a of the receive signal path and the mixer circuitry 2606a of the transmit signal path may include two or more mixers and may be arranged for quadrature downconversion and upconversion, respectively. In some embodiments, the mixer circuitry 2606a of the receive signal path and the mixer circuitry 2606a of the transmit signal path may include two or more mixers and may be arranged for image rejection (e.g., Hartley image rejection). In some embodiments, the mixer circuitry 2606a of the receive signal path and the mixer circuitry 2606a may be arranged for direct downconversion and direct upconversion, respectively. In some embodiments, the mixer circuitry 2606a of the receive signal path and the mixer circuitry 2606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2606 may include analog-to-digital converter (ADC) and digital-to-analog converter (DAC) circuitry and the baseband circuitry 2604 may include a digital baseband interface to communicate with the RF circuitry 2606.

In some dual-mode embodiments, a separate radio IC circuitry may be provided for processing signals for each spectrum, although the scope of the embodiments is not limited in this respect.

In some embodiments, the synthesizer circuitry 2606d may be a fractional-N synthesizer or a fractional N/N+1 synthesizer, although the scope of the embodiments is not limited in this respect as other types of frequency synthesizers may be suitable. For example, synthesizer circuitry 2606d may be a delta-sigma synthesizer, a frequency multiplier, or a synthesizer comprising a phase-locked loop with a frequency divider.

The synthesizer circuitry 2606d may be configured to synthesize an output frequency for use by the mixer circuitry 2606a of the RF circuitry 2606 based on a frequency input and a divider control input. In some embodiments, the synthesizer circuitry 2606d may be a fractional N/N+1 synthesizer.

In some embodiments, frequency input may be provided by a voltage controlled oscillator (VCO), although that is not a requirement. Divider control input may be provided by either the baseband circuitry 2604 or the applications processor 2602 depending on the desired output frequency. In some embodiments, a divider control input (e.g., N) may be determined from a look-up table based on a channel indicated by the applications processor 2602.

Synthesizer circuitry 2606d of the RF circuitry 2606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2606 may include an IQ/polar converter.

FEM circuitry 2608 may include a receive signal path which may include circuitry configured to operate on RF signals received from one or more antennas 2610, amplify the received signals and provide the amplified versions of the received signals to the RF circuitry 2606 for further processing. FEM circuitry 2608 may also include a transmit signal path which may include circuitry configured to amplify signals for transmission provided by the RF circuitry 2606 for transmission by one or more of the one or more antennas 2610. In various embodiments, the amplification through the transmit or receive signal paths may be done solely in the RF circuitry 2606, solely in the FEM 2608, or in both the RF circuitry 2606 and the FEM 2608.

In some embodiments, the FEM circuitry 2608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 2606). The transmit signal path of the FEM circuitry 2608 may include a power amplifier (PA) to amplify input RF signals (e.g., provided by RF circuitry 2606), and one or more filters to generate RF signals for subsequent transmission (e.g., by one or more of the one or more antennas 2610).

In some embodiments, the PMC 2612 may manage power provided to the baseband circuitry 2604. In particular, the PMC 2612 may control power-source selection, voltage scaling, battery charging, or DC-to-DC conversion. The PMC 2612 may often be included when the device 2600 is capable of being powered by a battery, for example, when the device is included in a UE. The PMC 2612 may increase the power conversion efficiency while providing desirable implementation size and heat dissipation characteristics.

While FIG. 26 shows the PMC 2612 coupled only with the baseband circuitry 2604. However, in other embodiments, the PMC 2612 may be additionally or alternatively coupled with, and perform similar power management operations for, other components such as, but not limited to, application circuitry 2602, RF circuitry 2606, or FEM 2608.

In some embodiments, the PMC 2612 may control, or otherwise be part of, various power saving mechanisms of the device 2600. For example, if the device 2600 is in an RRC_Connected state, where it is still connected to the RAN node as it expects to receive traffic shortly, then it may enter a state known as Discontinuous Reception Mode (DRX) after a period of inactivity. During this state, the device 2600 may power down for brief intervals of time and thus save power.

If there is no data traffic activity for an extended period of time, then the device 2600 may transition off to an RRC Idle state, where it disconnects from the network and does not perform operations such as channel quality feedback, handover, etc. The device 2600 goes into a very low power state and it performs paging where again it periodically wakes up to listen to the network and then powers down again. The device 2600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2602 and processors of the baseband circuitry 2604 may be used to execute elements of one or more instances of a protocol stack. For example, processors of the baseband circuitry 2604, alone or in combination, may be used execute Layer 3, Layer 2, or Layer 1 functionality, while processors of the application circuitry 2604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 27:
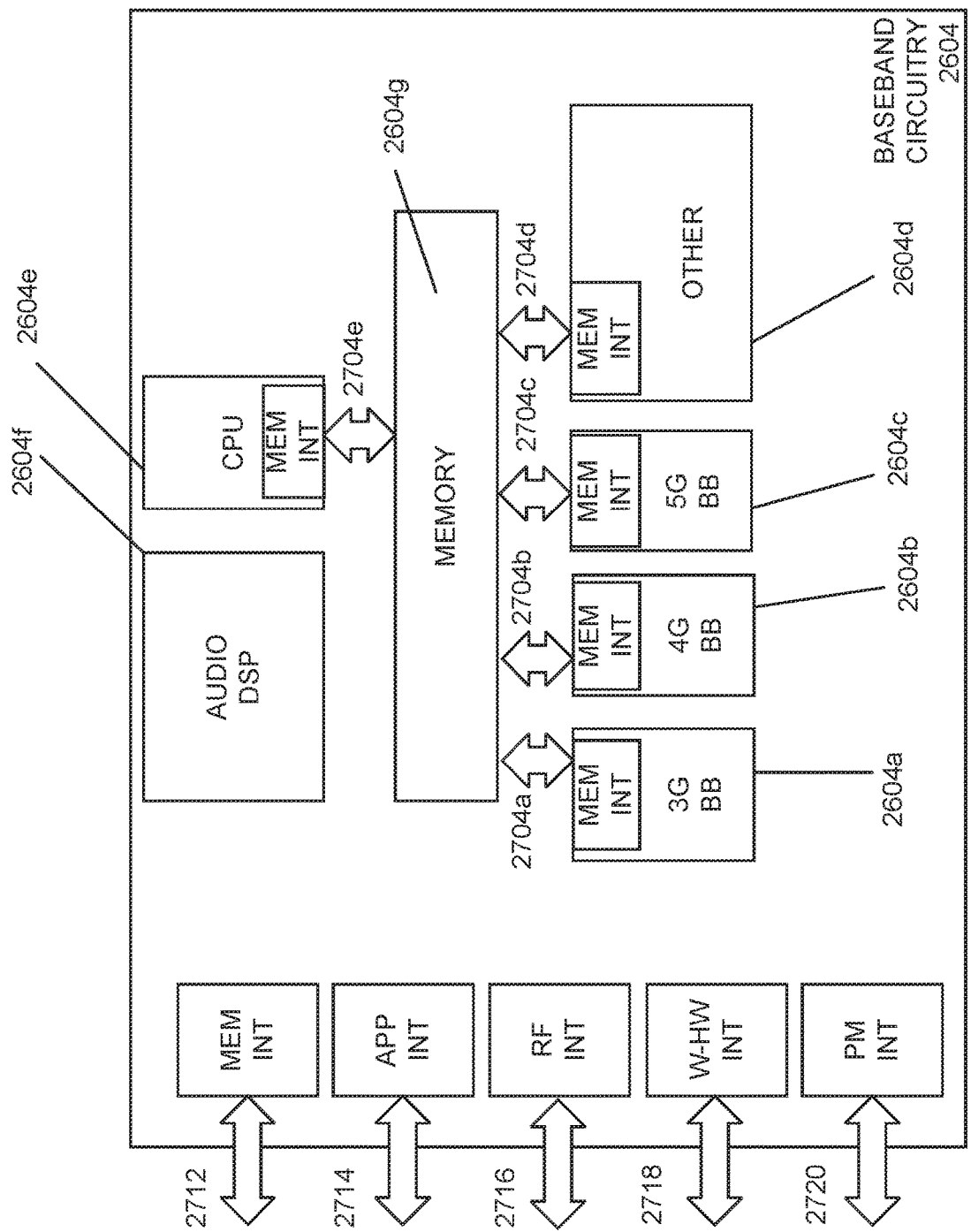
FIG. 27 illustrates interfaces of baseband circuitry in accordance with an example.

FIG. 27 illustrates example interfaces of baseband circuitry in accordance with some embodiments. As discussed above, the baseband circuitry 2604 of FIG. 26 may comprise processors 2604a-2604e and a memory 2604g utilized by said processors. Each of the processors 2604a-2604e may include a memory interface, 2704a-2704e, respectively, to send/receive data to/from the memory 2604g.

The baseband circuitry 2604 may further include one or more interfaces to communicatively couple to other circuitries/devices, such as a memory interface 2712 (e.g., an interface to send/receive data to/from memory external to the baseband circuitry 2604), an application circuitry interface 2714 (e.g., an interface to send/receive data to/from the application circuitry 2602 of FIG. 26), an RF circuitry interface 2716 (e.g., an interface to send/receive data to/from RF circuitry 2606 of FIG. 26), a wireless hardware connectivity interface 2718 (e.g., an interface to send/receive data to/from Near Field Communication (NFC) components, Bluetooth® components (e.g., Bluetooth® Low Energy), Wi-Fi® components, and other communication components), and a power management interface 2720 (e.g., an interface to send/receive power or control signals to/from the PMC 2612.

Figure 28:
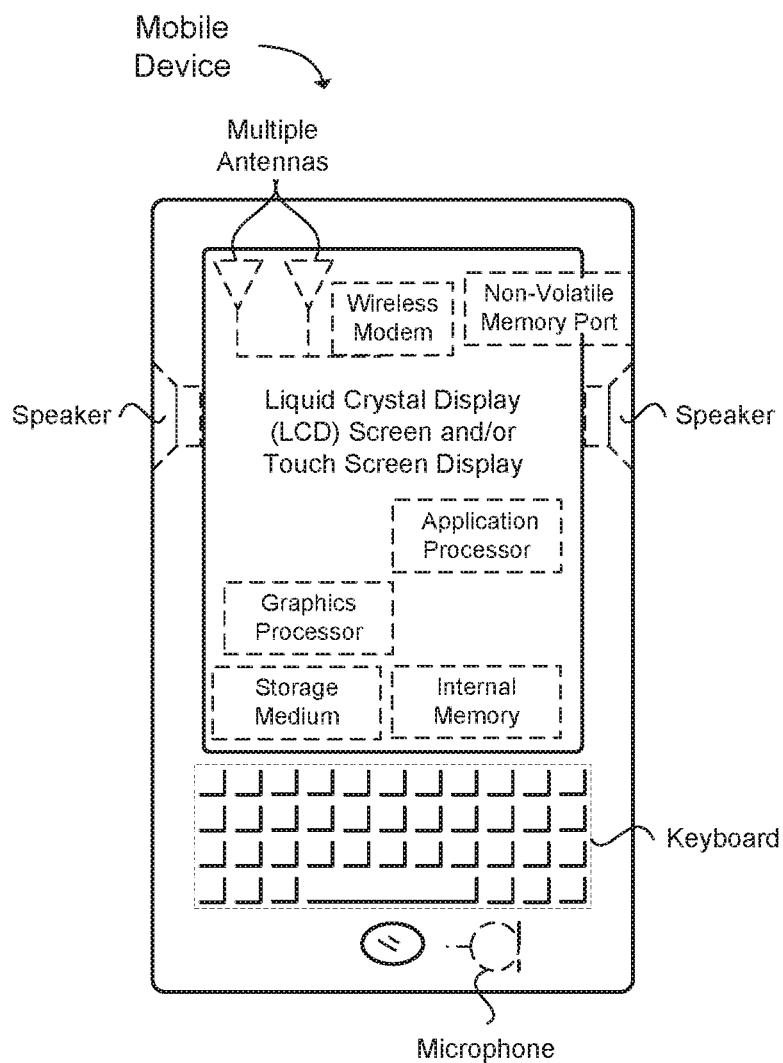
FIG. 28 illustrates a diagram of a wireless device (e.g., UE) in accordance with an example.

FIG. 28 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 28 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to perform downlink (DL) channel quality measurement reporting, the apparatus comprising: one or more processors configured to: decode, at the UE, a system information block type y bandwidth reduced (SIBy-BR) received from an eNodeB, wherein the SIB1-BR instructs the UE is to include a DL channel quality measurement report in a message 3 (Msg3) transmitted during a random access procedure between the UE and the eNodeB, wherein y is a positive integer greater than or equal to 1; determine, at the UE, a DL channel quality measurement for a DL channel between the UE and the eNodeB; and encode, at the UE, the Msg3 for delivery over an uplink channel to the eNodeB, wherein the Msg3 is delivered during the random access procedure and includes the DL channel quality measurement report with the DL channel quality measurement; and a memory interface configured to retrieve from a memory the DL channel quality measurement report.

Example 2 includes the apparatus of Example 1, further comprising a transceiver configured to: receive the SIB1-BR from the eNodeB; and transmit the Msg3 that includes the DL channel quality measurement report to the eNodeB.

Example 3 includes the apparatus of any of Examples 1 to 2, wherein the DL channel quality measurement report includes at least one of a repetition number and an aggregation level (AL) used at the UE to decode a hypothetical narrowband physical downlink control channel (NPDCCH) or a Machine Type Communication (MTC) PDCCH (MPDCCH) with a block error ratio (BLER) of less than or equal to 1%.

Example 4 includes the apparatus of any of Examples 1 to 3, wherein the one or more processors are configured to: encode the Msg3 for delivery to the eNodeB using a media access control (MAC) control element (CE) when early data termination (EDT) is employed at the eNodeB, wherein the MAC CE is identified using a reserved logical channel identifier (LCID).

Example 5 includes the apparatus of any of Examples 1 to 4, wherein the one or more processors are configured to: encode the Msg3 for delivery to the eNodeB using a media access control (MAC) control element (CE) or two unused media access control (MAC) subheader fields when early data termination (EDT) is not employed at the eNodeB, wherein the MAC CE is identified using a reserved logical channel identifier (LCID).

Example 6 includes the apparatus of any of Examples 1 to 5, wherein the one or more processors are configured to: encode a UE capability message for transmission to the eNodeB, wherein the UE capability message indicates that the UE is capable of DL channel quality measurement reporting in Msg3 transmissions to the eNodeB.

Example 7 includes the apparatus of any of Examples 1 to 6, wherein reference resources used for DL channel quality measurement reporting from the UE are not predefined for the UE.

Example 8 includes the apparatus of any of Examples 1 to 7, wherein the one or more processors are configured to determine the DL channel quality measurement for the DL channel based on a Msg2 received from the eNodeB during the random access procedure, wherein the Msg2 corresponds to a random access response (RAR) message.

Example 9 includes the apparatus of any of Examples 1 to 8, wherein the UE is configured for DL channel quality reporting in Msg3 in an enhanced Machine Type Communication (eMTC) system.

Example 10 includes the apparatus of any of Examples 1 to 9, wherein the UE is configured for DL channel quality reporting in Msg3 for an anchor carrier or a non-anchor carrier in a narrowband Internet of Things (NB-IoT) system.

Example 11 includes an apparatus of an eNodeB operable to decode a downlink (DL) channel quality measurement report received from a user equipment (UE), the apparatus comprising: one or more processors configured to: encode, at the eNodeB, a system information block type y bandwidth reduced (SIBy-BR) for transmission to the UE, wherein the SIB1-BR instructs the UE to include the DL channel quality measurement report in a message 3 (Msg3) transmitted during a random access procedure between the UE and the eNodeB, wherein y is a positive integer greater than or equal to 1; and decode, at the eNodeB, the Msg3 received over an uplink channel from the UE, wherein the Msg3 is delivered during the random access procedure and includes the DL channel quality measurement report; and a memory interface configured to send to a memory the DL channel quality measurement report.

Example 12 includes the apparatus of Example 11, further comprising a transceiver configured to: send the SIB1-BR to the UE; and receive the Msg3 that includes the DL channel quality measurement report from the UE.

Example 13 includes the apparatus of any of Examples 11 to 12, wherein the DL channel quality measurement report includes at least one of a repetition number and an aggregation level (AL) used at the UE to decode a hypothetical narrowband physical downlink control channel (NPDCCH) or a Machine Type Communication (MTC) PDCCH (MPDCCH) with a block error ratio (BLER) of less than or equal to 1%.

Example 14 includes the apparatus of any of Examples 11 to 13, wherein the Msg3 is received at the eNodeB via a media access control (MAC) control element (CE) when early data termination (EDT) is employed at the eNodeB, wherein the MAC CE is identified using a reserved logical channel identifier (LCID).

Example 15 includes the apparatus of any of Examples 11 to 14, wherein the one or more processors are configured to: decode a UE capability message received from the UE, wherein the UE capability message indicates that the UE is capable of DL channel quality measurement reporting in Msg3 transmissions to the eNodeB.

Example 16 includes the apparatus of any of Examples 11 to 15, wherein the eNodeB is included in an enhanced Machine Type Communication (eMTC) system.

Example 17 includes the apparatus of any of Examples 11 to 16, wherein the DL channel quality report in the Msg3 is for an anchor carrier or a non-anchor carrier in a narrowband Internet of Things (NB-IoT) system.

Example 18 includes at least one non-transitory machine readable storage medium having instructions embodied thereon for performing downlink (DL) channel quality measurement reporting at a user equipment (UE), the instructions when executed by one or more processors at the UE perform the following: decoding, at the UE, a system information block type y bandwidth reduced (SIBy-BR) received from an eNodeB, wherein the SIB1-BR instructs the UE is to include a DL channel quality measurement report in a message 3 (Msg3) transmitted during a random access procedure between the UE and the eNodeB, wherein y is a positive integer greater than or equal to 1; determining, at the UE, a DL channel quality measurement for a DL channel between the UE and the eNodeB; and encoding, at the UE, the Msg3 for delivery over an uplink channel to the eNodeB, wherein the Msg3 is delivered during the random access procedure and includes the DL channel quality measurement report with the DL channel quality measurement.

Example 19 includes the at least one non-transitory machine readable storage medium of Example 18, wherein the DL channel quality measurement report includes at least one of a repetition number and an aggregation level (AL) used at the UE to decode a hypothetical narrowband physical downlink control channel (NPDCCH) or a Machine Type Communication (MTC) PDCCH (MPDCCH) with a block error ratio (BLER) of less than or equal to 1%.

Example 20 includes the at least one non-transitory machine readable storage medium of any of Examples 18 to 19, further comprising instructions when executed perform the following: encoding the Msg3 for delivery to the eNodeB using a media access control (MAC) control element (CE) when early data termination (EDT) is employed at the eNodeB, wherein the MAC CE is identified using a reserved logical channel identifier (LCID).

Example 21 includes the at least one non-transitory machine readable storage medium of any of Examples 18 to 20, further comprising instructions when executed perform the following: encoding a UE capability message for transmission to the eNodeB, wherein the UE capability message indicates that the UE is capable of DL channel quality measurement reporting in Msg3 transmissions to the eNodeB.

Example 22 includes the at least one non-transitory machine readable storage medium of any of Examples 18 to 21, further comprising instructions when executed perform the following: determining the DL channel quality measurement for the DL channel based on a Msg2 received from the eNodeB during the random access procedure, wherein the Msg2 corresponds to a random access response (RAR) message.

Example 23 includes the at least one non-transitory machine readable storage medium of any of Examples 18 to 22, wherein the UE is configured for DL channel quality reporting in Msg3 in an enhanced Machine Type Communication (eMTC) system.

Example 24 includes the at least one non-transitory machine readable storage medium of any of Examples 18 to 23, wherein the UE is configured for DL channel quality reporting in Msg3 for an anchor carrier or a non-anchor carrier in a narrowband Internet of Things (NB-IoT) system.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a user equipment (UE) operable to perform downlink (DL) channel quality measurement reporting, the apparatus comprising:
one or more processors configured to:
decode, at the UE, a system information block type y bandwidth reduced (SIBy-BR) received from a base station, wherein the SIBy-BR instructs the UE to include a DL channel quality measurement report in a message 3 (Msg3) transmitted during a random access procedure between the UE and the base station, wherein y is a positive integer greater than or equal to 1;
determine, at the UE, a DL channel quality measurement for a DL channel between the UE and the base station; and
encode, at the UE, the Msg3 for delivery over an uplink channel to the base station, using a media access control (MAC) control element (CE) when early data termination (EDT) is employed at the base station, wherein the MAC CE is identified using a reserved logical channel identifier (LCID), and wherein the Msg3 is delivered during the random access procedure and includes the DL channel quality measurement report with the DL channel quality measurement, and wherein the DL channel quality measurement report corresponds to a non-anchor carrier in a narrowband (NB) on which the UE receives a random access response (RAR) during the random access procedure; and
a memory interface configured to retrieve from a memory the DL channel quality measurement report.

2. The apparatus of claim 1, further comprising a transceiver configured to:
receive the SIBy-BR from the base station; and
transmit the Msg3 that includes the DL channel quality measurement report to the base station.

3. The apparatus of claim 1, wherein the DL channel quality measurement report includes at least one of a repetition number and an aggregation level (AL) used at the UE to decode a hypothetical narrowband physical downlink control channel (NPDCCH) or a Machine Type Communication (MTC) PDCCH (MPDCCH) with a block error ratio (BLER) of less than or equal to 1%.

4. The apparatus of claim 1, wherein the one or more processors are configured to: encode the Msg3 for delivery to the base station using a media access control (MAC) control element (CE) or two unused media access control (MAC) subheader fields when early data termination (EDT) is not employed at the base station, wherein the MAC CE is identified using a reserved logical channel identifier (LCID).

5. The apparatus of claim 1, wherein the one or more processors are configured to: encode a UE capability message for transmission to the base station, wherein the UE capability message indicates that the UE is capable of DL channel quality measurement reporting in Msg3 transmissions to the base station.

6. The apparatus of claim 1, wherein reference resources used for DL channel quality measurement reporting from the UE are not predefined for the UE.

7. The apparatus of claim 1, wherein the UE is configured for DL channel quality reporting in Msg3 in an enhanced Machine Type Communication (eMTC) system.

8. The apparatus of claim 1, wherein the UE is configured for DL channel quality reporting in Msg3 for an anchor carrier or a non-anchor carrier in a narrowband Internet of Things (NB-IoT) system.

9. An apparatus of a base station operable to decode a downlink (DL) channel quality measurement report received from a user equipment (UE), the apparatus comprising:
one or more processors configured to:
encode, at the base station, a system information block type y bandwidth reduced (SIBy-BR) for transmission to the UE, wherein the SIBy-BR instructs the UE to include the DL channel quality measurement report in a message 3 (Msg3) transmitted during a random access procedure between the UE and the base station, wherein y is a positive integer greater than or equal to 1; and
decode, at the base station, the Msg3 received over an uplink channel from the UE, via a media access control (MAC) control element (CE) when early data termination (EDT) is employed at the base station, wherein the MAC CE is identified using a reserved logical channel identifier (LCID), and wherein the Msg3 is delivered during the random access procedure and includes the DL channel quality measurement report, and wherein the DL channel quality measurement report corresponds to a non-anchor carrier in a narrowband (NB) on which the UE receives a random access response (RAR) during the random access procedure; and
a memory interface configured to send to a memory the DL channel quality measurement report.

10. The apparatus of claim 9, further comprising a transceiver configured to:
send the SIBy-BR to the UE; and
receive the Msg3 that includes the DL channel quality measurement report from the UE.

11. The apparatus of claim 9, wherein the DL channel quality measurement report includes at least one of a repetition number and an aggregation level (AL) used at the UE to decode a hypothetical narrowband physical downlink control channel (NPDCCH) or a Machine Type Communication (MTC) PDCCH (MPDCCH) with a block error ratio (BLER) of less than or equal to 1%.

12. The apparatus of claim 9, wherein the one or more processors are configured to: decode a UE capability message received from the UE, wherein the UE capability message indicates that the UE is capable of DL channel quality measurement reporting in Msg3 transmissions to the base station.

13. The apparatus of claim 9, wherein the base station is included in an enhanced Machine Type Communication (eMTC) system.

14. The apparatus of claim 9, wherein the DL channel quality report in the Msg3 is for an anchor carrier or a non-anchor carrier in a narrowband Internet of Things (NB-IoT) system.

15. At least one non-transitory machine readable storage medium having instructions embodied thereon for performing downlink (DL) channel quality measurement reporting at a user equipment (UE), the instructions when executed by one or more processors at the UE perform the following:
decoding, at the UE, a system information block type y bandwidth reduced (SIBy-BR) received from a base station, wherein the SIBy-BR instructs the UE to include a DL channel quality measurement report in a message 3 (Msg3) transmitted during a random access procedure between the UE and the base station, wherein y is a positive integer greater than or equal to 1;

determining, at the UE, a DL channel quality measurement for a DL channel between the UE and the base station; and encoding, at the UE, the Msg3 for delivery over an uplink channel to the base station, using a media access control (MAC) control element (CE) when early data termination (EDT) is employed at the base station, wherein the MAC CE is identified using a reserved logical channel identifier (LCID), and wherein the Msg3 is delivered during the random access procedure and includes the DL channel quality measurement report with the DL channel quality measurement wherein the DL channel quality measurement report corresponds to a non-anchor carrier in a narrowband (NB) on which the UE receives a random access response (RAR) during the random access procedure.

16. The at least one non-transitory machine readable storage medium of claim 15, wherein the DL channel quality measurement report includes at least one of a repetition number and an aggregation level (AL) used at the UE to decode a hypothetical narrowband physical downlink control channel (NPDCCH) or a Machine Type Communication (MTC) PDCCH (MPDCCH) with a block error ratio (BLER) of less than or equal to 1%.

* * * * *